US012166857B2

(12) United States Patent
Chitrakar et al.

(10) Patent No.: US 12,166,857 B2
(45) Date of Patent: Dec. 10, 2024

(54) COMMUNICATION APPARATUS AND COMMUNICATION METHOD FOR MULTI-LINK SECURED RETRANSMISSIONS

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 18/521,004

(22) Filed: Nov. 28, 2023

(65) Prior Publication Data

US 2024/0146507 A1 May 2, 2024

Related U.S. Application Data

(63) Continuation of application No. 17/789,014, filed as application No. PCT/SG2020/050623 on Oct. 30, 2020, now Pat. No. 11,870,885.

(51) Int. Cl.
*H04L 29/06* (2006.01)
*H04L 9/06* (2006.01)
*H04W 12/033* (2021.01)
*H04W 12/106* (2021.01)
*H04W 76/15* (2018.01)
*H04W 76/18* (2018.01)

(52) U.S. Cl.
CPC ......... *H04L 9/0637* (2013.01); *H04W 12/033* (2021.01); *H04W 12/106* (2021.01); *H04W 76/15* (2018.02); *H04W 76/18* (2018.02)

(58) Field of Classification Search
None
See application file for complete search history.

(56) References Cited

U.S. PATENT DOCUMENTS

2010/0097992 A1\* 4/2010 Velev ............... H04L 12/66
370/328
2015/0089237 A1 3/2015 Kim et al.
(Continued)

OTHER PUBLICATIONS

Chitrakar R. et al., "Multi-link Secured Retransmissions", doc.: IEEE 802.11-20/0434r0, Mar. 11, 2020, 14 pages.
(Continued)

*Primary Examiner* — Andrew J Steinle
(74) *Attorney, Agent, or Firm* — Seed IP Law Group LLP

(57) ABSTRACT

A transmitting multi-link device (MLD) includes circuitry and a transmitter. The circuitry, in operation, constructs an Additional Authentication Data (AAD) and a Nonce, and encapsulates a plaintext medium access control (MAC) protocol data unit (MPDU), the AAD, and the Nonce to generate an encapsulated MPDU. The AAD includes an Address 1 (A1) field, to which a recipient MLD's MAC address is set, and an AAD Address 2 (A2) field, to which the transmitting MLD's MAC address is set. The Nonce includes a Nonce Address 2 (A2) field, to which the transmitting MLD's MAC address is set. The transmitter, in operation, transmits the encapsulated MPDU to the recipient MLD on a first link.

14 Claims, 25 Drawing Sheets

(56) References Cited

U.S. PATENT DOCUMENTS

| | | | |
|---|---|---|---|
| 2015/0271672 A1* | 9/2015 | Ding | H04W 12/033 |
| | | | 713/153 |
| 2018/0206174 A1* | 7/2018 | Zhou | H04B 1/0483 |
| 2019/0150214 A1 | 5/2019 | Zhou et al. | |
| 2020/0037152 A1 | 1/2020 | Seok et al. | |
| 2020/0267541 A1 | 8/2020 | Huang et al. | |

OTHER PUBLICATIONS

Duncan Ho, et al., "MLA Security Considerations", doc.: IEEE 802.11-19/1900r3, Jan. 9, 2020, 14 pages.

Extended European Search Report, dated May 23, 2023, for European Patent Application No. 20912756.2-1218. (11 pages).

Huizhao Wang, et al., "Multi-Link Device Instance & New Frame MAC Header", doc.: IEEE 802.11-19/1962r2, Nov. 17, 2019, 16 pages.

Huizhao Wang, et al., "Multi-Link Security And Aggregation Operations", doc.: IEEE 802.11-19/1963r1, Oct. 10, 2019, 15 pages.

IEEE Standards Association, "Draft Standards P802.11-REVmd/D2.4," XP068154623, Piscataway, NJ, U.S.A., Aug. 23, 2019. (203 pages).

International Search Report, mailed Feb. 11, 2021, for International Application No. PCT/SG2020/050623, 4 pages.

Patwardhan G. et al., "MLD Security Considerations", doc.: IEEE 802.11-20/1545r0, Oct. 1, 2020, 21 pages.

Po-Kai Huang, et al., "Multi-link Security Consideration", doc.: IEEE 802.11-19/1822r7, Nov. 5, 2019, 17 pages.

Xiaofei Wang, et al., "Discussion on Multi-link Operations", doc.: IEEE 802.11-19/1213r0, Jul. 9, 2019, 10 pages.

Singaporean Search Report and Written Opinion, dated May 14, 2024, for Singaporean Patent Application No. 11202250812B. (9 pages).

* cited by examiner

COMMUNICATION APPARATUS AND COMMUNICATION METHOD FOR MULTI-LINK SECURED RETRANSMISSIONS

BACKGROUND

1. Technical Field

The present embodiments generally relate to communication apparatuses, and more particularly relate to methods and apparatuses for multi-link secured transmissions.

2. Description of the Related Art

In today's world, communication devices are expected to wirelessly operate with the same capabilities as wired computing devices. For example, a user expects to be able to seamlessly watch a high definition movie streamed to the user's wireless communication device. This presents challenges for communication devices as well as the access points to which the communication devices wirelessly connect.

The Institute of Electrical and Electronics Engineers (IEEE) 802.11 group has recently formed the Extreme High Throughput (EHT) study group to address these challenges. Multi-link operation in the 2.4 GHz, 5 GHz and 6 GHz frequency bands has been identified as a key candidate technology for such communication. Multi-channel aggregation over multiple links is a natural way to create multifold increase in communication data throughput.

Further, security protocols including but not limited to Counter Mode Cipher Block Chaining Message Authentication Code Protocol (CCMP) or Galois/counter mode protocol (GCMP) are used in such IEEE 802.11 devices to provide data confidentiality, authentication, integrity, and replay protection for data frames, individually addressed robust management frames and group addressed management frames.

SUMMARY

One non-limiting and exemplary embodiment facilitates providing a first multi-link device (MLD) configured to operate with a first plurality of affiliated stations, comprising: circuitry, which in operation, sets up a robust security network association (RSNA) with a second MLD that is configured to operate with a second plurality of affiliated STAs, wherein two or more links have been established between STAs of the first plurality of affiliated STAs and corresponding STAs of the second plurality of affiliated STAs, wherein the circuitry constructs an Additional Authentication Data (AAD) and a Nonce that are used for cryptographical encapsulation of a MAC protocol data unit (MPDU) to form an encapsulated MPDU, wherein the AAD includes an Address 1 (A1) field, an Address 2 (A2) field, an Address 3 (A3) field and a Sequence Control (SC) field, and the Nonce includes an A2 field, wherein the SC field of the AAD is based on a SC field of the MPDU, and a transmitter, which in operation, transmits the encapsulated MPDU to the second MLD on a first link as an initial transmission, and upon failure of the initial transmission, retransmits the encapsulated MPDU on a second link without reperforming the cryptographical encapsulation.

Another non-limiting and exemplary embodiment facilitates providing a method for retransmission of a MPDU in a multi-link communication, comprising: setting up, at a first MLD, a robust security network association (RSNA) with a second MLD that is configured to operate with a second plurality of affiliated STAs, wherein two or more links have been established between STAs of the first plurality of affiliated STAs and corresponding STAs of the second plurality of affiliated STAs; constructing an Additional Authentication Data (AAD) and a Nonce, wherein the AAD includes an Address 1 (A1) field, an Address 2 (A2) field, an Address 3 (A3) field and a Sequence Control (SC) field, and the Nonce includes an A2 field, wherein the SC field of the AAD is based on a SC field of the MPDU; cryptographically encapsulating the MPDU using the AAD and Nonce to form an encapsulated MPDU; transmitting the encapsulated MPDU from the first MLD to the second MLD on a first link as an initial transmission, and retransmitting the encapsulated MPDU on a second link without reperforming the cryptographical encapsulation upon failure of the initial transmission.

It should be noted that general or specific embodiments may be implemented as a system, a method, an integrated circuit, a computer program, a storage medium, or any selective combination thereof. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the embodiments or the application and uses of the embodiments. Furthermore, there is no intention to be bound by any theory presented in the preceding Background or this Detailed Description. Furthermore, other desirable features and characteristics will become apparent from the subsequent detailed description and the appended claims, taken in conjunction with the accompanying drawings and this background of the disclosure.

Figure 1:
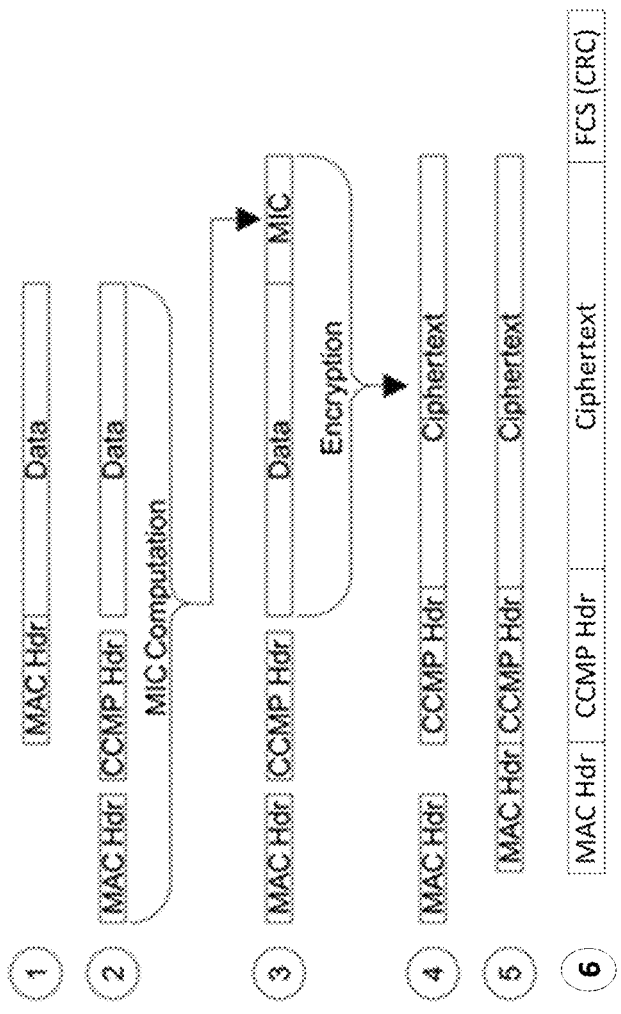
FIG. 1 illustrates the steps in processing a Medium Access Control (MAC) Protocol Data Unit (MPDU) using CCMP in accordance with various embodiments.

Referring to FIG. 1, an illustration depicts the steps in processing a MPDU using CCMP in accordance with various embodiments. At Step 1, a MAC Header is added to Data such as a MAC Service Data Unit (MSDU) or Management MPDU (MMDPU) to form a MPDU. At Step 2, the MAC Header is separated from the MPDU and a CCMP Header is created. At Step 3, Message Integrity Code (MIC) is computed and appended at the end. The MIC is used for authentication and integrity check. At Step 4, the combination of the Data and the MIC is encrypted to form a Ciphertext. The CCMP Header is then prepended to the Ciphertext. At Step 5, the MAC Header is restored by prepending it to the CCMP Header. At Step 6, Cyclic Redundancy Check (CRC) is computed over the entire MPDU and appended at the end of the MPDU to form a protected or encrypted MPDU.

Figure 2A:
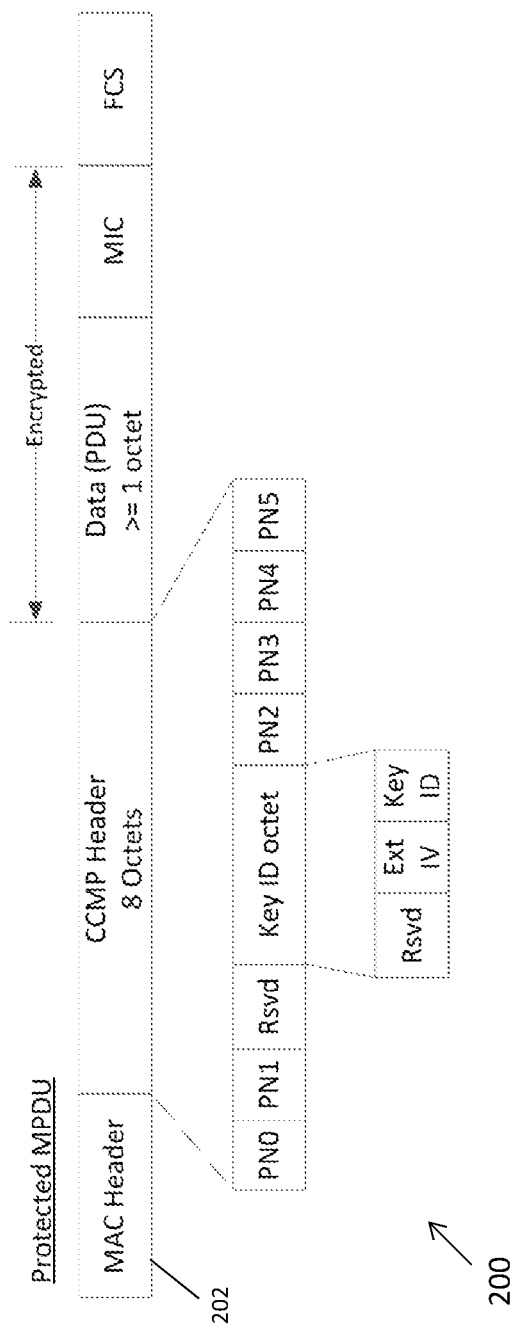
FIG. 2A depicts an illustration of a protected MPDU in accordance with various embodiments.

FIG. 2A depicts an illustration of a protected MPDU 200 in accordance with various embodiments. The protected MPDU 200 comprises a MAC Header field 202, a CCMP Header field, a Data (PDU) field, a MIC field and a FCS field. As explained in FIG. 1, the data (payload) field and MIC field are encrypted. The CCMP Header field comprises a PN0 field, PN1 field, Rsvd field, Key ID octet field, PN2 field, PN3 field, PN4 field and a PN0 field. The Key ID octet field comprises a Reserved (Rsvd) subfield, Ext IV subfield and a Key ID subfield.

Figure 2B:
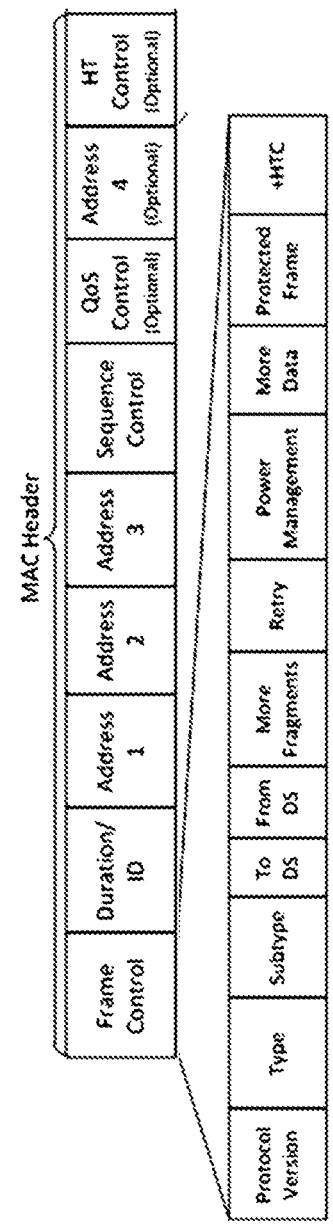
FIG. 2B depicts an illustration of a MAC Header of a protected MPDU in accordance with various embodiments.

The MAC Header field 202 is depicted in detail in FIG. 2B, and comprises a Frame Control (FC) field, duration/ID field, Address 1 (A1) field, Address 2 (A2) field, Address 3 (A3) field, Sequence Control (SC) field, an optional Quality of Service (QoS) Control field, an optional Address 4 (A4) field and an optional High Throughput (HT) field. The FC field further comprises a Protocol Version subfield, Type subfield, To Distribution Service (DS) subfield, From DS subfield, More Fragments subfield, Retry subfield, Power Management subfield, More Data subfield, Protected Frame subfield and a +HTC subfield.

Typically, the contents of the A1, A2 and A3 Address fields of data frames depend on the "To DS" and "From DS" subfields of the FC field of the MAC Header. This is illustrated in Table 1 below:

TABLE 1

| To DS | From DS | Address 1 (A1) | Address 2 (A2) | Address 3 (A3) | Address 4 (A4) |
|---|---|---|---|---|---|
| 0 | 0 | RA = DA | TA = SA | BSSID | N/A |
| 0 | 1 | RA | TA = BSSID | SA | N/A |
| 1 | 0 | RA = BSSID | TA | DA | N/A |
| 1 | 1 | RA | TA | DA | SA |

If the content of the "To DS" and "From DS" subfields are both "0", the content of the A1 field will be Receiver Address (RA) (=Destination Address (DA)), the content of the A2 field will be Transmitter Address (TA) (=Source Address (SA)), the content of the A3 field will be the basic service set identifier (BSSID) while Address 4 is not present. If the content of the "To DS" and "From DS" subfields are "0" and "1" respectively, the content of the A1 field will be the RA, the content of the A2 field will be Transmitter Address (TA) (=BSSID), the content of the A3 field will be the SA while Address 4 is not present. If the content of the "To DS" and "From DS" subfields are "1" and "0" respectively, the content of the A1 field will be RA (=BSSID), the content of the A2 field will be the TA, the content of the A3 field will be the DA while Address 4 is not present. If the content of the "To DS" and "From DS" subfields are both "1", the content of the A1 field will be the RA, the content of the A2 field will be the TA, the content of the A3 field will be the DA while Address 4 is set to SA.

For management frames, the content of the A1, A2 and A3 Address fields are typically the same as that of data frames with "To DS"=0 and "From DS"=0. That is, the content of the A1 field will be RA (=DA), and the content of the A2 field will be TA (=SA). A3 depends on the frame type but is set to BSSID for most cases. If the STA is transmitting the Management frame to an access point (AP) that is in a multiple BSSID set, the Address 3 field is the BSSID of the AP's BSS (which is either the transmitted BSSID or a nontransmitted BSSID), irrespective of whether the STA is associated with that AP.

Figure 3:
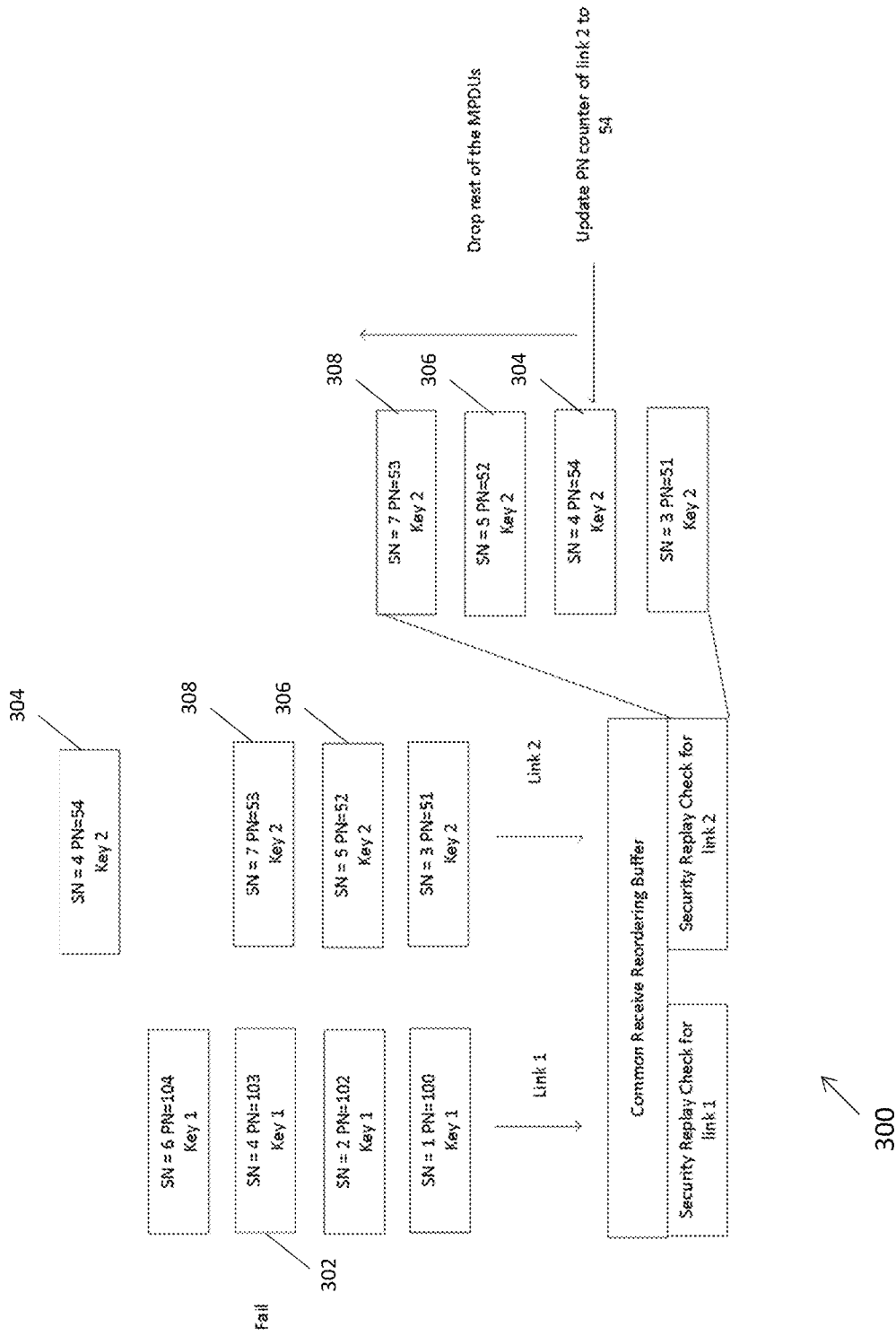
FIG. 3 depicts an illustration of a multi-link MPDU transmission using a separate Pairwise Temporal Key (PTK) for each link.

Multi-link operations in next generation wireless LANs such as 802.11 be may allow MPDUs of the same TID (Traffic ID) to be transmitted on different links at the same time. However, such multi-link transmissions may lead to some unexpected operations when security encapsulation is applied to the MPDUs as explained below. When MPDUs of the same TID (Traffic ID) are enabled to be transmitted on different links at the same time, in order to ensure that the recipient MLD is able to correctly re-order the MPDUs received over different links, the same Sequence Number (SN) space may be used to assign SNs to the MSDUs or MMPDUs carried in the MPDUs regardless of the link used for the actual transmission. During the initial setup of links between an AP MLD and a non-AP MLD (e.g. right after multi-link Association procedure), a single PMK (Pairwise Master Key) may be negotiated between an AP MLD and non-AP MLD to be used as the master key for secured transmissions between the two MLDs. PTK (Pairwise Temporal Key) and GTK/IGTK ((Integrity) Group Temporal Key) that are used for secure encapsulation/decapsulations of MPDUs may be derived from the same PMK for different links. It is possible that separate PTKs and separate GTK/IGTKs are generated for use in different links. FIG. 3 depicts an illustration 300 of a multi-link MPDU transmission using a separate PTK for each link. In this example, a transmitter MLD transmits MPDUs on a Link 1 and a Link 2 to a receiver MLD. Link 1 uses a PTK Key 1, while Link 2 uses a different PTK Key 2. The Packet Number (PN) counter used for each link is also different, even though the MPDU transmissions on both links still use a common sequence number (SN). For example, the PN counter for MPDUs transmitted on Link 1 starts from PN=100, while the PN counter for MPDUs transmitted on Link 2 starts from PN=51.

In the present example, MPDU 302 on Link 1 fails to be transmitted, so it is scheduled to be retransmitted on a different link such as Link 2 instead of Link 1. Since Link 2 uses a different PTK (i.e. Key 2), the MPDU needs to be encapsulated with Key 2 and a new PN=54 (since it is scheduled to be retransmitted after the transmission of MPDU 308 with PN=53) as MPDU 304, even though it still shares the same SN=4 as the MPDU 302. At the receiving side, the receiver MLD then reorders the received MPDUs on Link 2 according to the SN of each received MPDU including MPDU 304. When reordering up to SN=4 i.e. up to received MPDU 304 with SN=4 and PN=54, the receiver MLD updates a replay counter to PN=54. As a consequence, the rest of the MPDUs with SN greater than 4 and with PN less than 54 (i.e. received MPDU 306 with SN=6, PN=52 and received MPDU 308 with SN=7, PN=53) are dropped, causing an unintended replay rejection issue.

Figure 4:
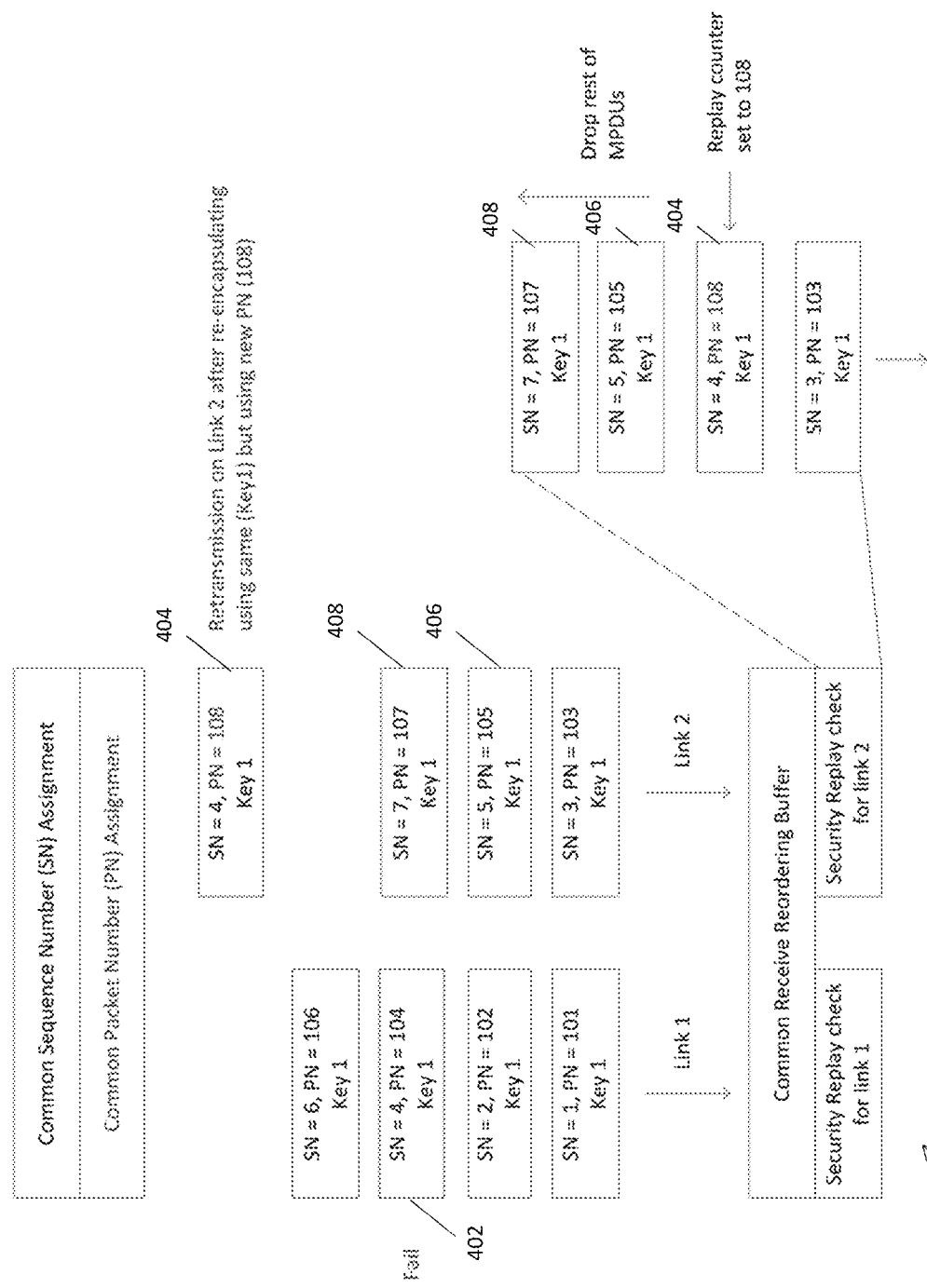
FIG. 4 depicts an illustration of a multi-link MPDU transmission using a single PTK for all links in accordance with various embodiments.

Even if a single PTK is used for all links, if the retransmitted MPDU is encapsulated again with a new PN, the Replay rejection issue will still occur. This can be seen in FIG. 4 which depicts an illustration 400 of a multi-link MPDU transmission using a single PTK for all links in accordance with various embodiments. Similar to FIG. 3, a transmitter MLD transmits MPDUs on a Link 1 and a Link 2 to a receiver MLD. The difference is that both Link 1 and Link 2 use the same PTK Key 1. As a result, both links use a common SN assignment and a common PN assignment.

In the present example, MPDU 402 with SN=4 and PN=104 on Link 1 fails to be transmitted, so it is scheduled to be retransmitted on a different link such as Link 2 instead of Link 1. Since Link 2 has a different A1, A2 fields compared to Link 1, the MPDU needs to be encapsulated again as MPDU 404 and with a new PN=108 (since it is scheduled to be retransmitted after the transmission of MPDU 408 with PN=107), even though it still shares the same SN=4 as the MPDU 402. The receiver MLD then reorders the received MPDUs on Link 2 according to the SN of each received MPDU including MPDU 404. When reordering up to SN=4 i.e. up to received MPDU 404 with SN=4 and PN=108, the receiver MLD updates a replay counter to PN=108. As a consequence, the rest of the MPDUs with SN greater than 4 and with PN less than 108 (i.e. received MPDU 406 with SN=6, PN=105 and received MPDU 408 with SN=7, PN=107) are dropped, causing a replay rejection issue.

Further, IEEE 802.11be may mandate separate MAC addresses to be used per link or it is also possible that different links are allowed to use the same MAC address. If separate MAC addresses are used for links the problem of a same Nonce value being reused to protect different data (a security flaw) when the TA for two transmit links are the same, but the RA for two receive links are different, and a frame is retransmitted on another link using the same A2 (i.e. =TA) and same PN (i.e. PN remains the same across retransmissions to avoid out-of-order PN received after SN re-ordering by a receiver MLD) may be averted. However, IEEE 802.11 specification makes the following statement regarding the usage of Nonce and PN:

"CCM requires a fresh temporal key for every session. CCM also requires a unique nonce value for each frame protected by a given temporal key, and CCMP uses a 48-bit packet number (PN) for this purpose. Reuse of a PN with the same temporal key voids all security guarantees."

This means that reuse of the same PN for retransmissions on a different link to avoid the replay rejection issue, although solves the issue, but may introduce a security flaw. The assumption for the above is that retransmitted MPDUs needs to be re-encapsulated when re-transmitted on a different link. The present disclosure provides several options to avoid such security related issues introduced by multi-link transmissions.

Figure 5:
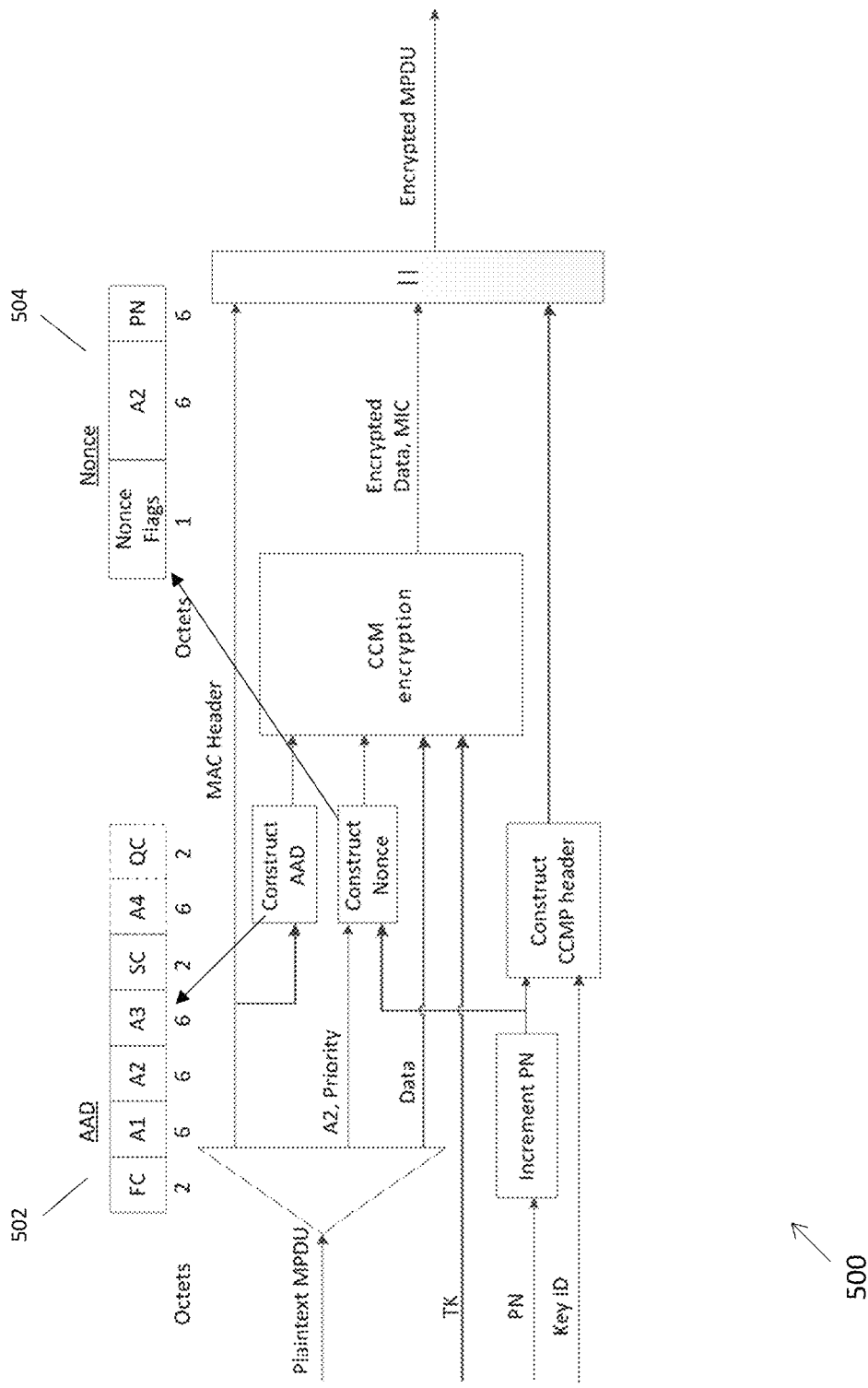
FIG. 5 depicts an illustration of a CCMP encapsulation process to form an encrypted MPDU in accordance with various embodiments.

FIG. 5 depicts an illustration of a CCMP encapsulation process to form an encrypted MPDU as per the IEEE 802.11 specification. In particular, an Additional Authentication Data (AAD) 502 and a Nonce 504 are constructed and used for cryptographical encapsulation of the MPDU to form the encrypted or protected MPDU. The AAD 502 comprises a Frame Control (FC) field, an Address 1(A1) field, Address 2 (A2) field, Address 3 (A3) field, Sequence Control (SC) field, an optional Address 4 (A4) field and an optional Quality Control (QC) field, while the Nonce 504 comprises a Nonce Flags field, an A2 field and a PN field. The contents of the A1, A2, A3 fields in the AAD 502 and the contents of the A2 field in the Nonce 504 are taken from the A1, A2, A3 fields of the MPDU that is to be encapsulated (or decapsulated, in the case of a decapsulation process of an encrypted MPDU).

In single link 802.11 STAs, protected MPDUs are retransmitted with minimal changes:
  The Retry subfield (bit 11) of the FC field is set to 1. However, the Retry subfield as well as several subfields of the FC field are typically masked to 0 during CCMP encapsulation.
  The CRC is re-computed, but FCS is not an input to the CCMP encapsulation.
  MPDUs are only encapsulated during initial transmission but not for retransmissions. However, for MLDs, rules for retransmission of protected MPDUs may depend on the link on which the MPDUs are retransmitted. If the same link is used for retransmission, MPDUs are only encapsulated during initial transmission but not for retransmissions. If a different link is used for retransmission (assuming different MAC Addresses of the affiliated STAs at either end of the link), MPDUs need to be encapsulated again prior to retransmission (possibly with the same PN to avoid the replay rejection issue). However, reuse of PN with the same security key may lead to security flaws.

Therefore, the present invention seeks to avoid CCMP encapsulation during re-transmissions of protected frames on a different link (even when the per-link MAC addresses are different).

Figure 6:
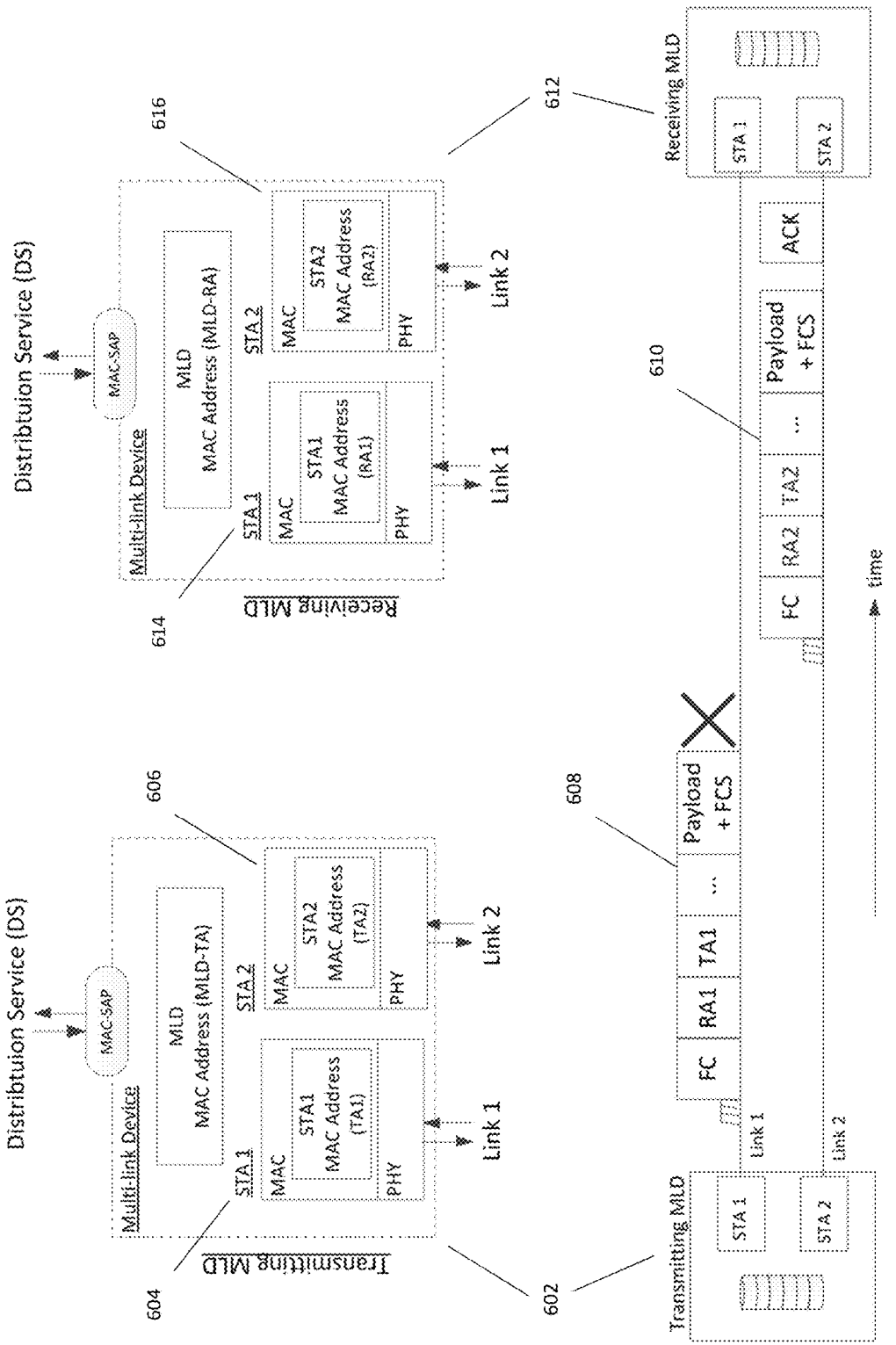
FIG. 6 depicts an illustration of how an unprotected MPDU is retransmitted on a different link in accordance with a first embodiment.

FIG. 6 depicts an illustration of how an unprotected MPDU is retransmitted on a different link in accordance with a first embodiment. Transmitting MLD 602 is configured to operate with a first plurality of affiliated STAs such as STA 604 and STA 606. A MAC address MLD-TA identifies the transmitting MLD 602 and may be used to represent the MLD for communication with the DS (Distribution Service), while the MAC addresses of STA 604 and STA 606 are TA1 and TA2. Similarly, receiving MLD 612 is configured to operate with a second plurality of affiliated STAs such as STA 614 and STA 616. A MAC address MLD-RA identifies the receiving MLD 612, while the MAC addresses of STA 614 and STA 616 are RA1 and RA2 respectively. For an MLD, the MLD MAC address may be the same as one of its per-link MAC addresses or different. However, it is assumed that the per-link MAC addresses are different from each other (i.e. TA1≠TA2; RA1≠RA2). It will be appreciated that two or more STAs may form the first and second plurality of affiliated STAs, and two or more links may be formed between STAs of the first plurality of affiliated STAs and corresponding STAs of the second plurality of STAs without necessarily requiring each STA to be connected by a link. For example, Link 1 may be setup between STA 604 and STA 614, while Link 2 may be setup between STA 606 and STA 616. The settings described above are also applicable for retransmission of protected or unprotected MPDUs that will be further discussed in various embodiments below. Further, it is assumed, particularly for retransmission of protected MPDUs, that a robust security network association (RSNA) has been set up between the transmitting MLD and the receiving MLD and all the necessary secret keys (e.g. PTK, GTK/IGTK etc.) have been generated/distributed.

As shown in illustration 600, the transmitting MLD 602 transmits an unprotected MPDU 608 on a Link 1 to receiving MLD 612 i.e. from STA 604 to STA 614. Therefore, the A1, A2, A3 fields of the MPDU 608 are set to the MAC addresses of receiving STA 614 (i.e. RA1) and transmitting STA 604 (i.e. TA1) respectively. As an initial transmission, the Retry subfield in the FC field of the MPDU 608 is set to 0. In an event that the transmission fails, due to various reasons (e.g. temporary failure of Link 1) the MPDU may be retransmitted as unprotected MPDU 610 on a Link 2 i.e. from STA 606 to STA 616. Unprotected MPDUs may be retransmitted on another link by simply setting the Retry subfield in the Frame Control (FC) field of the MPDU to 1 and swapping A1, A2 and A3 in the MAC header. Therefore, the A1 field of the MPDU 610 is set to the MAC address of receiving STA 616 (i.e. RA2) and the A2 field is set to the MAC address of transmitting STA 606 (i.e. TA2). Further, the Reset subfield in the FC field of MPDU 610 is set to 1. In MPDUs in which A3 is set to BSSID (e.g. Data frames with To/From DS=0; or management frames), if the BSSID of Link 2 is different, A3 (which is set to the BSSID in such frames; the BSSID typically being the same as the AP MLD's MAC address on that link) is also changed to MLD-TA (or the BSSID for that link if it is different from MLD-TA) if transmitter is AP MLD and MLD-RA (or the BSSID for that link if it is different from MLD-RA) if transmitter is non-AP MLD. If the per-link MAC addresses are the same, retransmission rules may be the same as single link STAs (i.e. even the A1, A2 and A3 addresses do not need to be changed).

Figure 7A:
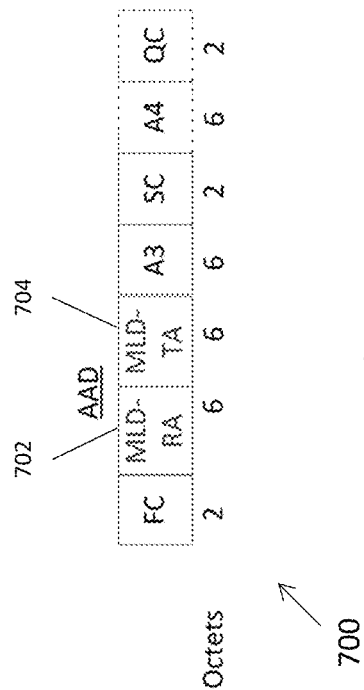
FIG. 7A depicts an illustration of an Additional Authentication Data (AAD) frame in accordance with a first embodiment.
Figure 7B:
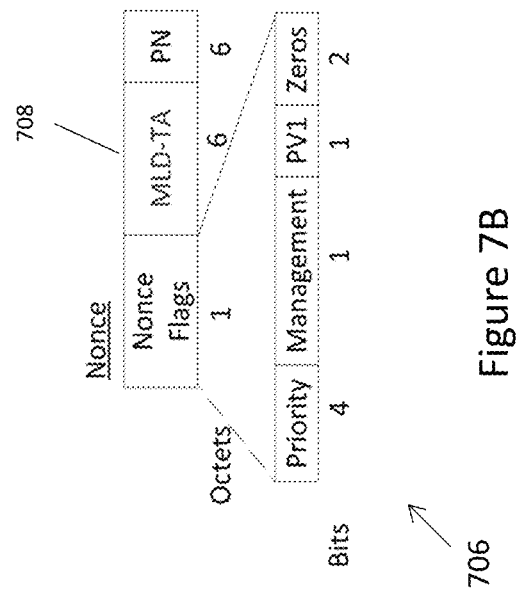
FIG. 7B depicts an illustration of a Nonce frame in accordance with a first embodiment.

For an initial transmission of a protected MPDU according to a first embodiment, during CCMP encapsulation of the protected MPDU addressed to a peer MLD, MLD MAC addresses are used to generate the AAD and Nonce instead of the MAC addresses of the transmitting/receiving affiliated STAs (i.e. A1, A2 fields of the MPDU to be transmitted). FIG. 7A depicts an illustration of an AAD 700 in accordance with the first embodiment. While similar to the AAD 502, the A1 field 702 and A2 field 704 of AAD 700 are set to the MAC addresses of the receiving MLD and the transmitting MLD respectively (i.e. MLD-RA and MLD-TA) instead of the MAC addresses of the transmitting/receiving affiliated STAs which are indicated in the A1, A2, A3 fields of the protected MPDU to be transmitted. In MPDUs in which A3 is set to BSSID (e.g. Data frames with To/From DS=0; or management frames), if the BSSID of Link 2 is different, A3 (which is set to the BSSID in such frames; the BSSID typically being the same as the AP MLD's MAC address on that link) is also changed to MLD-TA (or the BSSID for that link if it is different from MLD-TA) if transmitter is AP MLD and MLD-RA (or the BSSID for that link if it is different from MLD-RA) if transmitter is non-AP MLD. FIG. 7B depicts an illustration of a Nonce 706 in accordance with the first embodiment. While similar to the Nonce 504, the A2 field 708 of Nonce 706 is set to the MAC address of the transmitting MLD (i.e. MLD-TA) instead of the MAC address of the transmitting affiliated STA which is indicated in the A2 field of the protected MPDU to be transmitted. The Protected MPDU may be saved in memory of the transmitting MLD until successful acknowledgement of receiving the MPDU from the receiving MLD or upon expiry of MSDU lifetime.

Upon transmission failure of the protected MPDU according to the first embodiment, the protected MPDU is retrieved from memory (if saved during initial transmission) and retransmitted after setting Retry subfield of FC field to 1, swapping A1, A2 fields of MAC Header and adding a new CRC. Advantageously, since the AAD and Nonce remain the same regardless of the Per-link MAC Addresses used in the links, there is no need to perform CCMP encapsulation again. Indeed, fields of the MAC Header whose contents may change during retransmissions (e.g. Duration/ID field, HT Control field) are not included in the AAD and hence do not affect the encapsulation process. For similar reasons, several sub-fields in the Frame Control field are masked to 0:

i) Subtype subfield (bits 4 5 6) in a Data frame masked to 0
ii) Retry subfield (bit 11) masked to 0
iii) Power Management subfield (bit 12) masked to 0
iv) More Data subfield (bit 13) masked to 0
v) Protected Frame subfield (bit 14) always set to 1
vi) +HTC subfield (bit 15) as follows:
   Masked to 0 in all Data frames containing a QoS Control field
   Unmasked otherwise If the protected MPDU was not saved in memory during the initial transmission, the original unprotected MPDU is retrieved from memory (e.g. from the transmit buffer) and encapsulated again but using the MAC Addresses of the MLDs for A1, A2, A3 fields (and A3 field if applicable) of AAD and A2 field of the Nonce.

Figure 8:
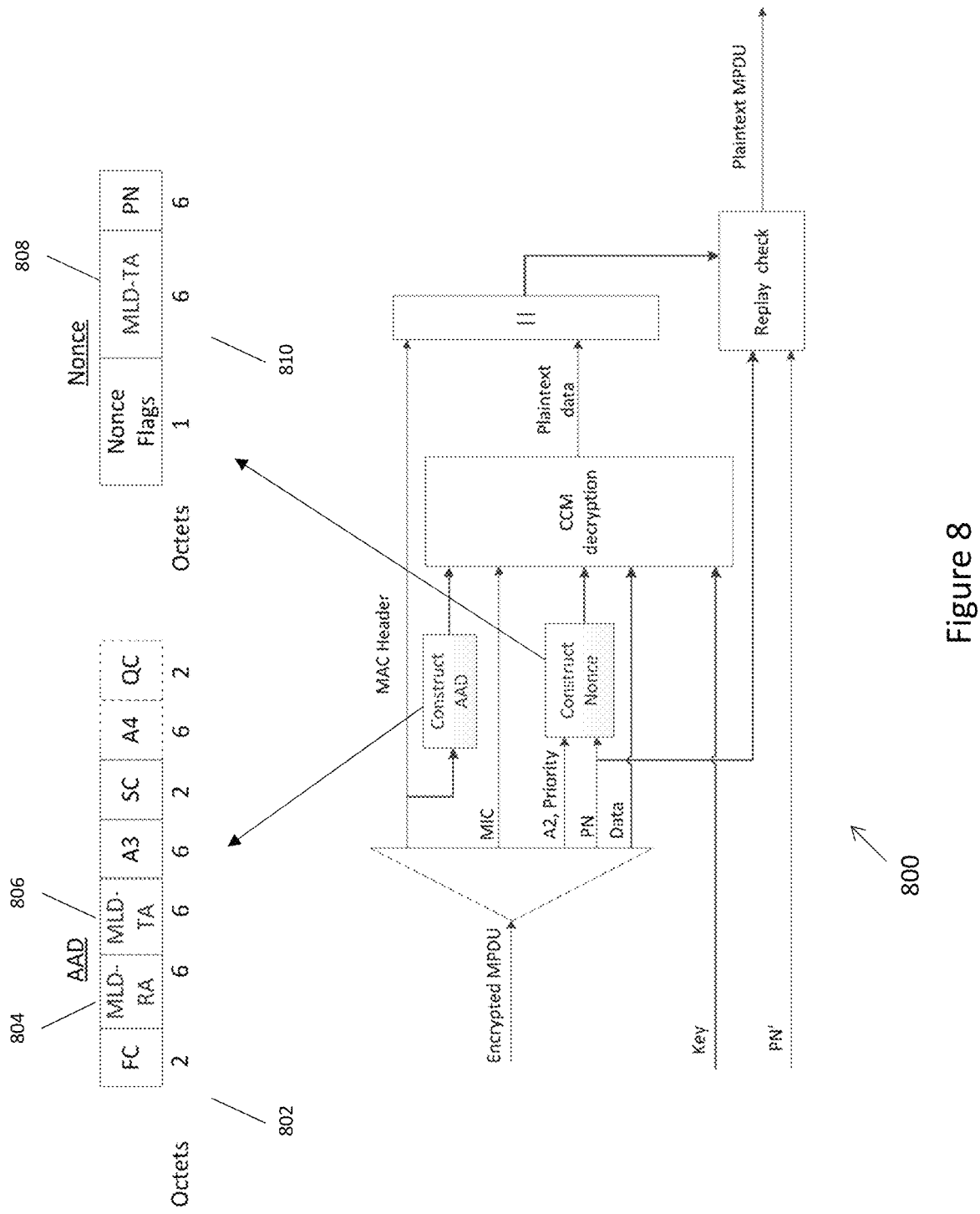
FIG. 8 depicts an illustration of a CCMP decapsulation process to form a plaintext MPDU in accordance with a first embodiment.

Regardless of the link used for reception of protected MPDUs (from a peer MLD), during CCMP decapsulation, MLD MAC addresses are used to generate the AAD and Nonce instead of the MAC addresses of the transmitting/receiving affiliated STAs (i.e. A1, A2 fields of the received MPDU). FIG. 8 depicts an illustration 800 of a CCMP decapsulation process used by a receiving MLD to form a plaintext MPDU in accordance with the first embodiment. An AAD 802 and a Nonce 810 are constructed for decapsulation of the protected or encrypted MPDU. In accordance with the first embodiment, A1 field 804 and A2 field 806 in AAD 802 are set to the MAC address of the receiving MLD (i.e. MLD-RA) and MAC address of the transmitting MLD (i.e. MLD-TA) respectively. In MPDUs in which A3 is set to BSSID (e.g. Data frames with To/From DS=0; or management frames), if the BSSID of Link 2 is different, A3 (which is set to the BSSID in such frames; the BSSID typically being the same as the AP MLD's MAC address on that link) is also changed to MLD-TA (or the BSSID for that link if it is different from MLD-TA) if the transmitter is AP MLD and MLD-RA (or the BSSID for that link if it is different from MLD-RA) if the transmitter is non-AP MLD. Further, A2 field 808 in the Nonce 810 is set to the MAC address of the transmitting MLD (i.e. MLD-TA). The A2 field of the received MPDU is checked before switching to MLD MAC address to verify the identity of the transmitting STA (i.e. A2 field of the received MPDU should indicate the MAC address of the transmitting STA affiliated with the peer MLD). The A1 field of the received MPDU would already have been checked during receive frame filtering.

For retransmission of protected MPDUs according to the first embodiment, it is assumed that the MLD MAC addresses are known to both transmitter and receiver MLD (e.g. exchanged during Association/link enablement procedure). Further, it is assumed that the same PTK is used for all the links. If different links use different PTK, MPDUs need to be encapsulated again prior to retransmission on a different link. If the per-link MAC addresses are the same and a single PTK is used for all links, retransmission rules are the same as single link STAs.

As a variation, instead of using MLD-TA and MLD-RA, AP may also provide the MAC addresses to use for the A1, A2 fields (and A3 field if applicable) during the construction of AAD and Nonce to non-AP STA e.g. during 4-way, group key handshake or using some management frame exchange. This may also be useful for single link STAs that use dynamic MAC addresses (e.g. MAC randomization) wherein the addresses change between an initial transmission and a retransmission. The provided MAC addresses are then used to construct the AAD and Nonce instead of the various address fields of the protected MPDU. If the A1and A2 fields (and A3 field if applicable) used in AAD and Nonce are always fixed, even after change of MAC addresses in the retransmitted frames (either A1, A2 or both (and A3 if applicable)), CCMP decapsulation will still pass.

Figure 9:
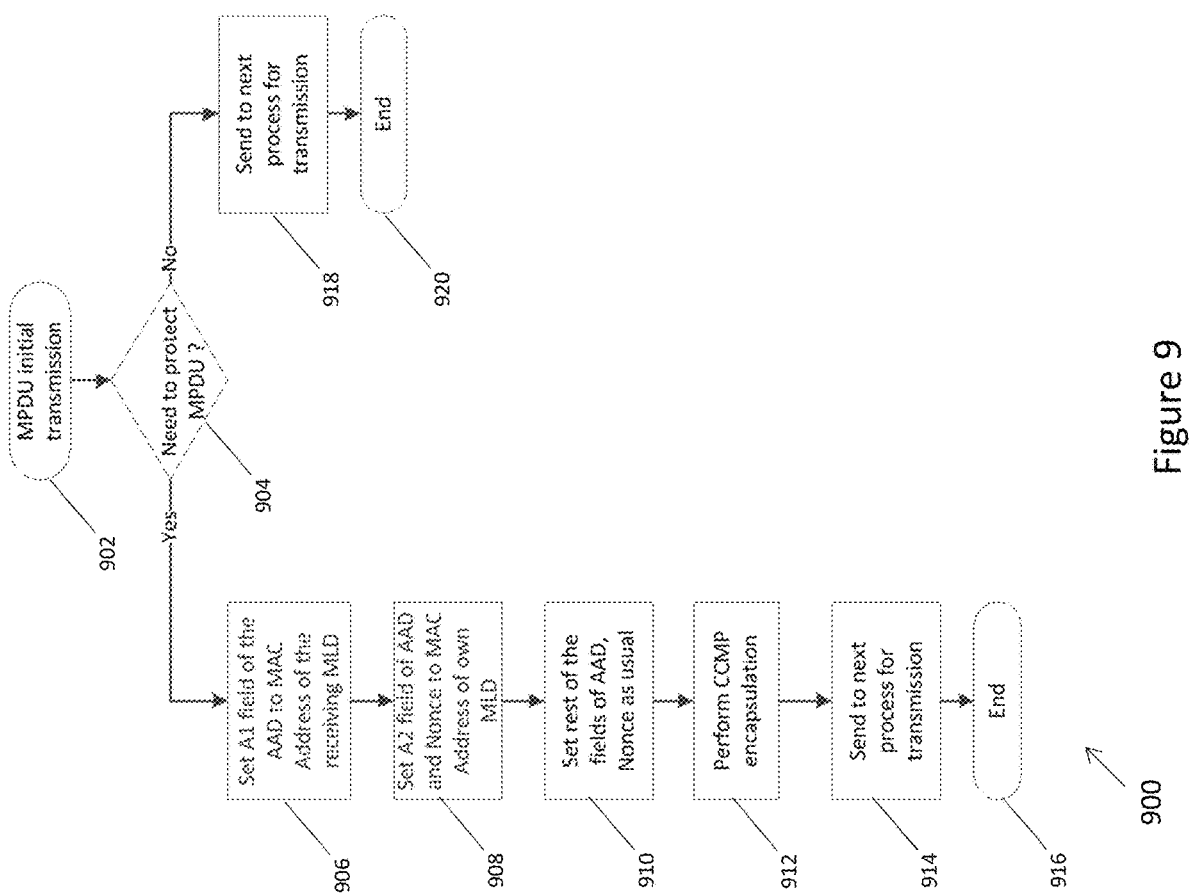
FIG. 9 depicts a flowchart for an initial transmission of a MPDU in accordance with a first embodiment.

FIG. 9 depicts a flowchart 900 for an initial transmission of a MPDU in accordance with the first embodiment. At step 902, an MPDU is prepared for initial transmission. At step 904, it is determined whether the MPDU needs to be protected. If it is determined that the MPDU does not need to be protected, the process goes to step 918 where the MPDU is sent to a next process for transmission to a receiving MLD (e.g. for channel access), and the process ends at step 920. If it is determined at step 904 that the MPDU needs to be protected, the process goes to step 906 where the A1 field of a constructed AAD is set to the MAC address of the receiving MLD. At step 908, the A2 field of the AAD and a constructed Nonce are set to the MAC address of own MLD i.e. transmitting MLD. Although not shown in the figure, in MPDUs in which A3 is set to BSSID (e.g. Data frames with To/From DS=0; or management frames), if the BSSID of Link 2 is different, A3 (which is set to the BSSID in such frames; the BSSID typically being the same as the AP MLD's MAC address on that link) is also changed to MLD-TA (or the BSSID for that link if it is different from MLD-TA) if the transmitter is AP MLD and MLD-RA (or the BSSID for that link if it is different from MLD-RA) if the transmitter is non-AP MLD. At step 910, the rest of the fields in the AAD and Nonce are set as usual i.e. in accordance with IEEE 802.11 standards. At step 912, CCMP encapsulation of the MPDU is performed to generate a protected or encrypted MPDU. At step 914, the protected MPDU is sent to a next process for transmission to the receiving MLD, and the process ends at step 916.

Figure 10:
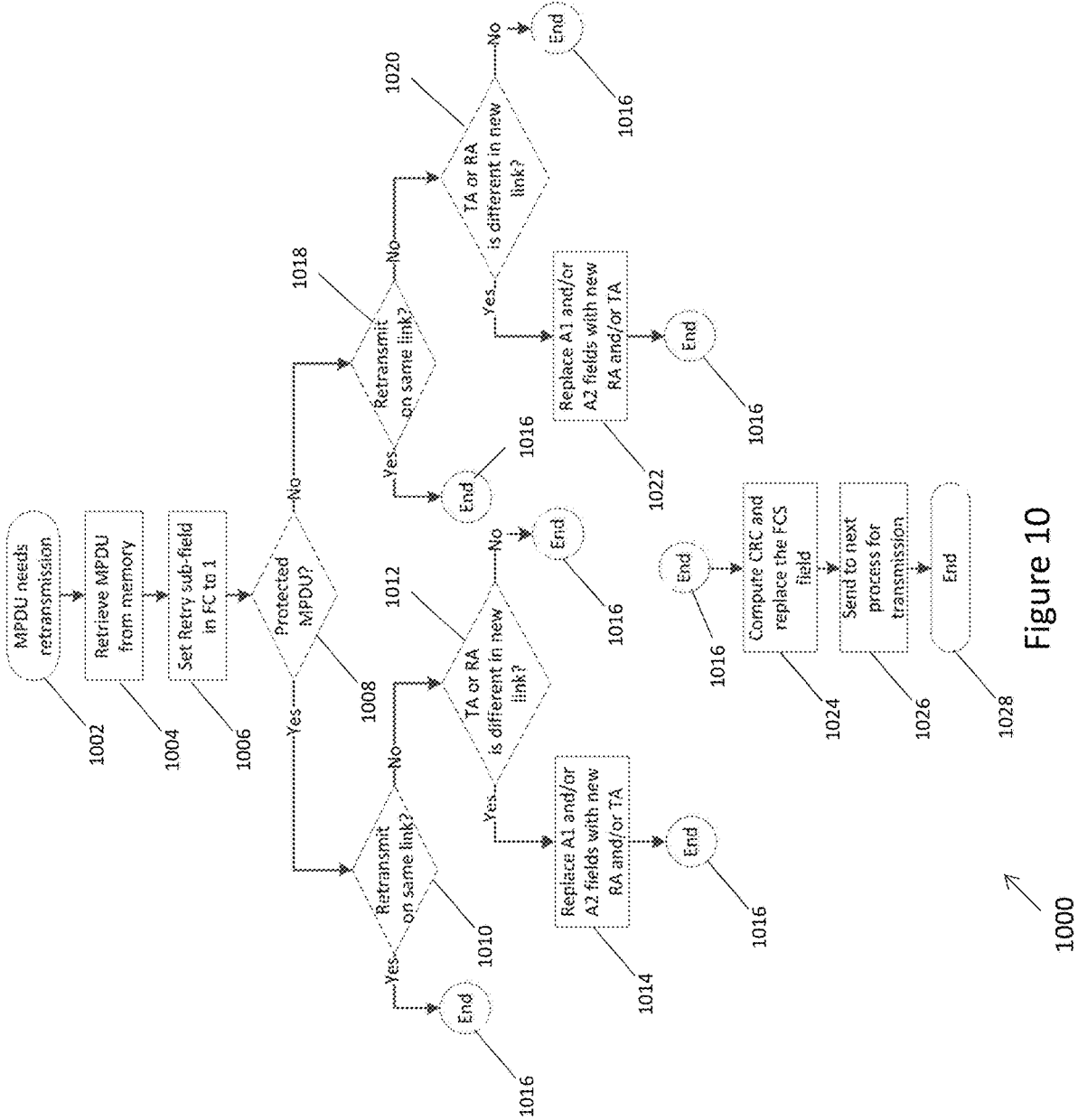
FIG. 10 depicts a flowchart for a retransmission of a MPDU in accordance with a first embodiment.

FIG. 10 depicts a flowchart 1000 for a retransmission of a MPDU in accordance with the first embodiment. At step 1002, it is determined that an MPDU needs retransmission i.e. after failure of an initial transmission (e.g. upon reception of a BlockAck frame indicating failure of the initial transmission). At step 1004, the saved MPDU is retrieved from memory. At step 1006, the Retry subfield in FC field of the MPDU is set to 1. At step 1008, it is determined whether the MPDU is a protected or unprotected MPDU. If it is an unprotected MPDU, the process goes to step 1018 where it is determined whether the MPDU should be retransmitted on the same link as the initial transmission. If it is determined that the MPDU should be retransmitted on the same link as the initial transmission, the process continues from step 1016. Otherwise, if it is determined that the MPDU should be retransmitted on a different link, the process goes to step 1020 where it is determined whether the TA or RA is different in the new link that is to be used for retransmission. If it is determined that the TA or RA in the new link is the same as those for the initial transmission link, the process continues from step 1016. Otherwise, the process goes to step 1022 where the A1 and/or A2 fields are set to the new RA and/or TA of the new link, and then the process continues from step 1016.

If it is determined at step 1008 that the MPDU is protected, the process goes to step 1010 where it is determined whether the protected MPDU is to be retransmitted on the same link as the initial transmission. If it is determined that the same link will be used for retransmission, the process continues from step 1016. Otherwise, the process goes to step 1012 where it is determined whether the TA or RA is different in the new link that is to be used for retransmission. If the TA or RA is determined to be different in the new link compared to the link used for the initial transmission, the process continues from step 1016. Otherwise, the process goes to step 1014 where the A1 and/or A2 fields are set to the new RA and/or TA of the new link, and then the process continues from step 1016. Further, from step 1016, the MPDU is sent a next process for retransmission and the process ends at step 1028. Notably, processing for retransmissions of protected and unprotected MPDUs (i.e. regardless of outcome from step 1008) are exactly the same. Although not shown in the figure, in MPDUs in which A3 is set to BSSID (e.g. Data frames with To/From DS=0; or management frames), if the BSSID of Link 2 is different, A3 is set to the BSSID of Link2 (the BSSID typically being the same as the AP MLD's MAC address on that link).

Figure 11:
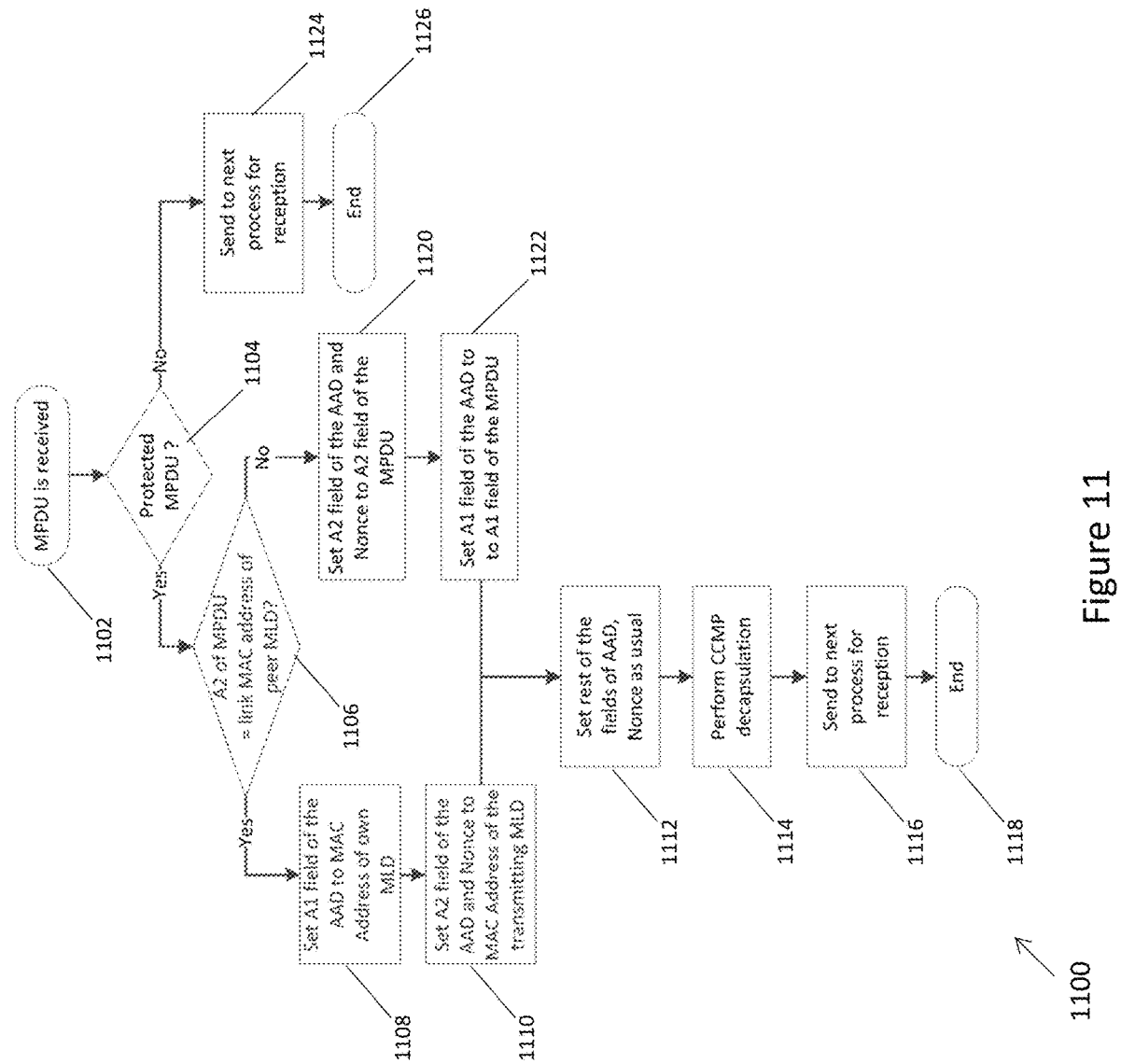
FIG. 11 depicts a flowchart for reception of a MPDU in accordance with a first embodiment.

FIG. 11 depicts a flowchart 1100 for reception of a MPDU in accordance with the first embodiment. At step 1102, a MPDU is received. At step 1104, it is determined whether the MPDU is protected. If the MPDU is not protected, the process goes to step 1124 where the MPDU is sent to a next process for reception and the process then ends at step 1126. If it is determined at step 1104 that the MPDU is protected, the process goes to step 1106 where it is determined if the A2 field of the received MPDU indicates the MAC address that identifies a peer MLD. For a non-AP MLD, peer MLD refers to an AP MLD with which it is associated. For an AP MLD, peer MLD refers to a non-AP MLD that is associated with it. If it is determined that the A2 field of the received MPDU does not indicate the MAC address of the peer MLD, the convention procedure for decapsulation is used and the process goes to step 1120 where the A2 field of the constructed AAD and Nonce are set to the A2 field of the MPDU, proceeds to step 1122 where the A1 field of the constructed AAD is set to the A1 field of the MPDU (and A3 as well if applicable), and then continues from step 1112. If it is determined at step 1106 that the A2 field is set to the MAC address that identifies a peer MLD, the process goes to step 1108 where the A1 field of the constructed AAD is set to the MAC address of the receiving MLD, proceeds to step 1110 where the A2 field of the constructed AAD and Nonce are set to the MAC address of the transmitting MLD, and then continues from step 1112. Although not shown in the figure, in MPDUs in which A3 is set to BSSID (e.g. Data frames with To/From DS=0; or management frames), if the BSSID of Link 2 is different, A3 (which is set to the BSSID in such frames; the BSSID typically being the same as the AP MLD's MAC address on that link) is also changed to MLD-TA (or the BSSID for that link if it is different from MLD-TA) if the transmitter is AP MLD and MLD-RA (or the BSSID for that link if it is different from MLD-RA) if the transmitter is non-AP MLD. At step 1112, the rest of the fields in the AAD and Nonce are set as usual. At step 1114, CCMP decapsulation is performed on the protected MPDU with the constructed AAD and Nonce. At step 1116, the decrypted MPDU is sent to a next process for reception and the process ends at step 1118. An advantageous effect of the above process is that cross-link re-transmissions of encrypted MPDUs are possible without re-performing CCMP encapsulations and the receiving MLD can still correctly decapsulate the MDPUs.

Figure 12:
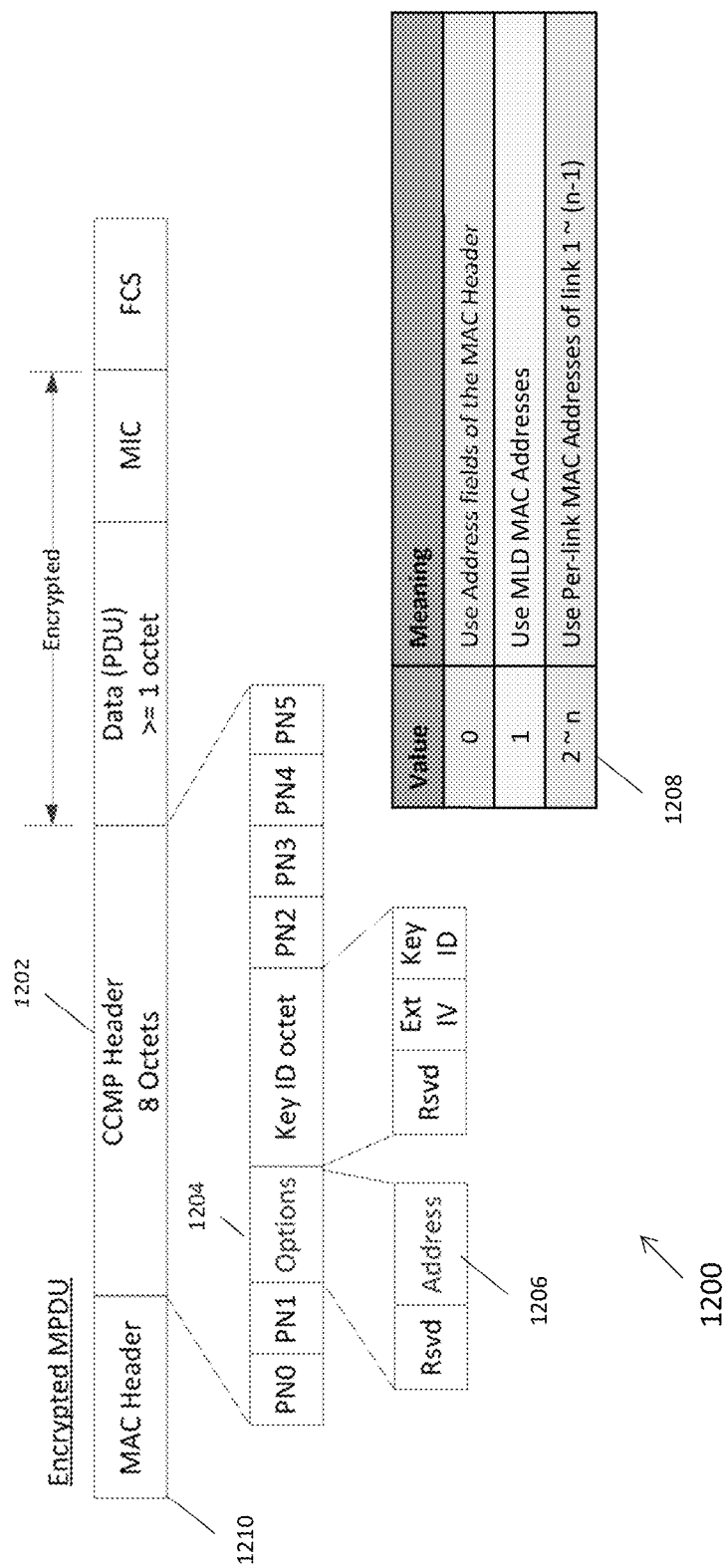
FIG. 12 depicts an illustration of a protected MPDU in accordance with a second embodiment.

According to a second embodiment, it is possible to use either MLD MAC addresses or A1, A2 fields of a protected MPDU to be transmitted, or the Per-link MAC addresses of any of the affiliated STAs to generate the AAD and Nonce during CCMP encapsulation of a Protected MPDU during an initial transmission, and the same Protected MPDU is re-transmitted (after setting the Retry subfield in the FC and changing some other fields as explained earlier) on a different link without going through the CCMP encapsulation again. This is made possible by modifying some field in the MAC Header of a Protected MPDU, for example the CCMP Header to signal the addresses used to generate the AAD and Nonce during CCMP encapsulation. A transmitting MLD may choose different addresses to generate the AAD and Nonce during CCMP encapsulation based on deployment scenarios, for example if the same PTK if used for all the links, the MLD MAC addresses may be used as explained in the first embodiment. Alternatively, the Per-link MAC of the link used for the original transmission of an MPDU may be used for the generation of AAD and Nonce, and if the MPDU is later retransmitted in a different link, the signal in the CCMP Header can instruct the receiving MLD to use the Per-link MAC addresses of the link used for the original transmission. Similarly, if the Per-link MAC addresses of the two links are the same, the transmitter MLD may signal that the Address fields of the MAC Header of the MPDU are to be used to generate the AAD and the Nonce. However, if different links use different PTKs, during retransmissions in a different link, the MPDU will need to be encapsulated again using the PTK for that link. In this case, the CCMP encapsulation may follow the conventional method of using the Address fields of the MAC Header of the (re-transmitted) MPDU to generate the AAD and the Nonce fields. However, even in this case the transmitting MLD can still signal in the CCMP Header that the Address fields of the MAC Header of the (re-transmitted) MPDU are to be used to generate the AAD and the Nonce fields. Thus, the signaling of the MAC Addresses in the CCMP Header enables the receiving MLD to correctly decapsulate a received Protected MPDU (either during an initial transmission or retransmissions) regardless of the different methods used by the transmitting MLD to encapsulate the MPDU. FIG. 12 depicts an illustration of a protected MPDU 1200 in accordance with the second embodiment. The CCMP Header 1202 of the MPDU 1200 now includes a new Options field 1204 that comprises a Rsvd subfield and an Address subfield 1206. The Address subfield 1206 indicates to the receiver MLD what values to adopt for the A1, A2, A3 fields in the AAD and the A2 fields in the Nonce during the decapsulation of the protected MPDU 1200. Referring to table 1208, if the value of the Address subfield 1206 is set to 0, the A1, A2, A3 fields in the AAD and Nonce are to be set to the A1, A2, A3 fields of the MAC Header 1210 respectively. If the value of the Address subfield 1206 is set to 1, the A1, A2, A3 fields in the AAD and Nonce are to be set to the MAC addresses of the receiving MLD and the transmitting MLD respectively. If the value of the Address subfield 1206 is set from 2 up to n, the A1, A2, A3 fields in the AAD and Nonce are to be set to the per-link MAC addresses of the affiliated STAs associated with link 1 to link (n−1). Further, the A1, A2, A3 fields in the MAC Header 1210 are set to MAC addresses of the transmitted link (i.e. TA1/TA2, RA1/RA2) and A3 set to the BSSID of the link as per normal.

During CCMP decapsulation, the receiving MLD uses the Address subfield 1206 to decide the MAC addresses for generating the AAD and Nonce. It is assumed that the per-link MAC addresses of all enabled links are known to both transmitter and receiver MLD (e.g. exchanged during Association/link enablement procedure). Advantageously, during retransmission of failed MPDUs according to the second embodiment (after setting Retry subfield of FC to 1, swapping A1, A2, A3 fields (and A3 as well if the BSSID of the link is different) of MAC Header and adding a new CRC), CCMP encapsulation is not performed.

An assumption for the second embodiment is that the same PTK is used for all the links. Other fields in the MAC Header 1210 may also be used to indicate Address information, but CCMP Header 1202 would be a natural choice since the field is used to indicate security related information and also because the CCMP Header 1202 is not included in the encapsulation process and is transmitted in the plain text. Further, link 1 to link (n−1) in the table 1208 represents the first link to the (n−1)th link that has been setup between the two MLDs and need not necessarily be the same as the Link IDs assigned to the links, although it is possible that they are the same value. For example, link 1 may represent Link ID 2, link 2 may represent Link ID 4, etc. However, if different links use different PTKs, during retransmissions in a different link, the MPDU will need to be encapsulated again using the PTK for that link. In this case, the CCMP encapsulation may follow the conventional method of using the Address fields of the MAC Header of the (re-transmitted) MPDU to generate the AAD and the Nonce fields. However, even in this case the transmitting MLD can still signal in the CCMP Header that the Address fields of the MAC Header of the (re-transmitted) MPDU are to be used to generate the AAD and the Nonce fields, enabling the receiving MLD to correctly decapsulate a received Protected MPDU.

Figure 13:
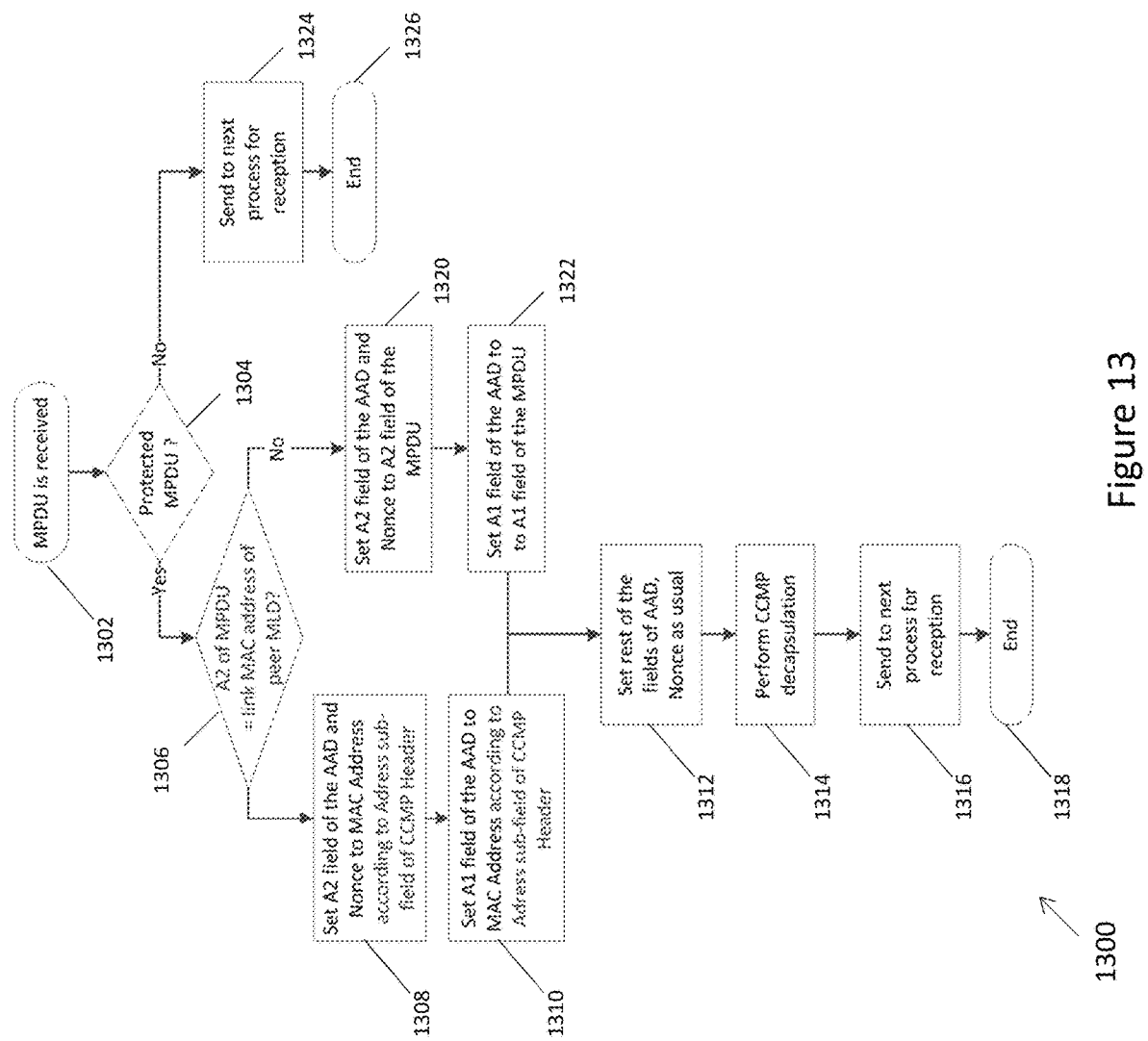
FIG. 13 depicts a flowchart for reception of a MPDU in accordance with a second embodiment.

FIG. 13 depicts a flowchart 1300 for reception of a MPDU in accordance with the second embodiment. At step 1302, a MPDU is received. At step 1304, it is determined whether the MPDU is protected. If the MPDU is not protected, the process goes to step 1324 where the MPDU is sent to a next process for reception and the process then ends at step 1326. If it is determined at step 1304 that the MPDU is protected, the process goes to step 1306 where it is determined if the A2 field of the received MPDU indicates the MAC address that identifies a peer MLD. For a non-AP MLD, peer MLD refers to an AP MLD with which it is associated. For an AP MLD, peer MLD refers to a non-AP MLD that is associated with it. If it is determined that the A2 field of the received MPDU does not indicate the MAC address of the peer MLD, the conventional decapsulation method is used and the process goes to step 1320 where the A2 field of the constructed AAD and Nonce are set to the A2 field of the MPDU, proceeds to step 1322 where the A1 field of the constructed AAD is set to the A1 field of the MPDU, and then continues from step 1312. If it is determined at step 1306 that the A2 field is set to the MAC address that identifies a peer MLD, the process goes to step 1308 where the A2 field of the constructed AAD and Nonce is set to the MAC address according to the Address subfield in the CCMP Header of the MPDU, proceeds to step 1310 where the A1 field of the constructed AAD is set to the MAC address according to the Address field in the CCMP header of the MPDU, and then continues from step 1312.

At step 1312, the rest of the fields in the AAD and Nonce are set as usual. Although, not shown in the figure, in MPDUs in which A3 is set to BSSID (e.g. Data frames with To/From DS=0; or management frames), if the BSSID of Link 2 is different, A3 (which is set to the BSSID in such frames; the BSSID typically being the same as the AP MLD's MAC address on that link) is also changed to MLD-TA (or the BSSID for that link if it is different from MLD-TA) if the transmitter is AP MLD and MLD-RA (or the BSSID for that link if it is different from MLD-RA) if the transmitter is non-AP MLD. At step 1314, CCMP decapsulation is performed on the protected MPDU with the constructed AAD and Nonce. At step 1316, the decrypted MPDU is sent to a next process for reception and the process ends at step 1318. In the second embodiment, the receiver MLD always checks the CCMP Header of the MPDU to decide the A1, A2, A3 field settings of the constructed AAD and the A2 field of the Nonce, regardless of initial transmission or retransmission. Advantageously, there is more flexibility to the transmitting MLD in deciding Address values for CCMP encapsulation.

According to a third embodiment, during CCMP encapsulation (during initial transmission of a protected MPDU), the A1, A2, A3 fields of the MPDU to be transmitted are used to generate the AAD and Nonce i.e. same as legacy single link STAs. However, during retransmission of failed protected MPDUs (after setting Retry subfield of FC to 1, swapping A1, A2 fields (and A3 if applicable) of MAC Header and adding a new CRC), the CCMP Header indicates which A1, A2, A3 fields are to be used by the receiver MLD to generate the AAD and Nonce for decapsulation. CCMP encapsulation is not performed during retransmissions.

Figure 14:
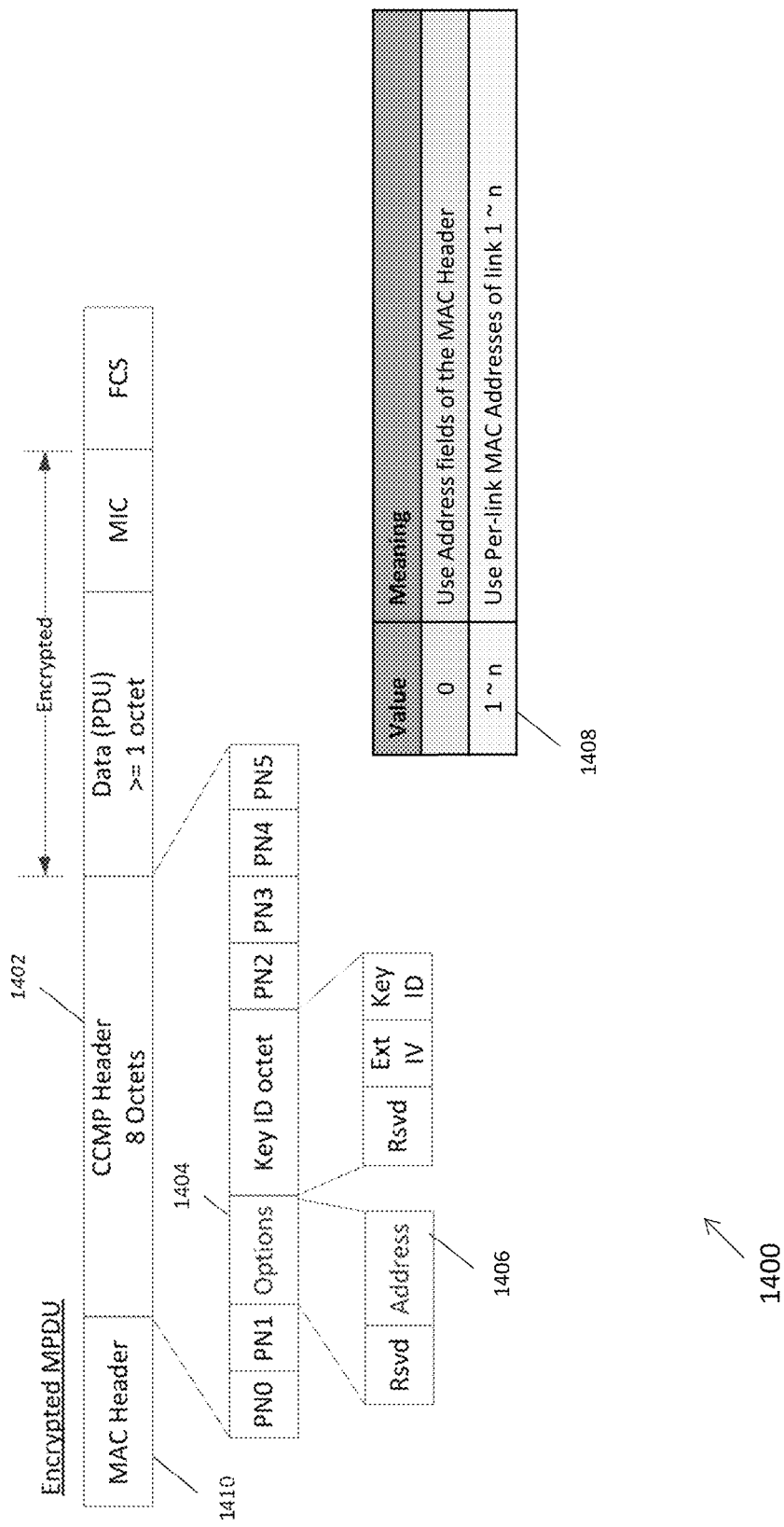
FIG. 14 depicts an illustration of a protected MPDU in accordance with a third embodiment.

FIG. 14 depicts an illustration of a protected MPDU 1400 in accordance with the third embodiment. The CCMP Header 1402 of the MPDU 1400 now includes a new Options field 1404 that comprises a Rsvd subfield and an Address subfield 1406. During CCMP decapsulation, if the Retry subfield of the FC field in MAC Header field 1410 has a value of 1 (i.e. indicating that the received MPDU is a retransmission), the receiving MLD uses the Address field 1406 to decide the MAC addresses to generate the AAD and Nonce. Referring to table 1408, if the value of the Address subfield 1406 is set to 0, the A1, A2, A3 fields in the AAD and the A2 field in the Nonce are to be set to the respective address fields of the MAC Header 1410. For example, the A1 field of the constructed AAD will be set to RA1 (or RA2) if the A1 field of the MPDU 1400 indicates RA1 (or RA2), and the A2 field of the AAD and Nonce is set to TA1 (or TA2) if the A2 field of the MPDU 1400 indicates TA1 (or TA2) and the A3 field is set to the A3 field of the MPDU. A value of 0 in the Address subfield 1406 also indicates that retransmission of the MPDU 1400 is on the same link as the initial transmission (or the Per-link MAC addresses in a different link is the same as those in the link used for the initial transmission), and the receiving MLD can use conventional methods to decapsulate the protected MPDU. If the value of the Address subfield 1406 is set to 1 up to n, the A1 and A2 fields in the AAD and the A2 field in the Nonce are to be set to the per-link MAC addresses of the affiliated STAs associated with link 1 to link (n), while A3 field in AAD is set to the Per-link MAC address of the affiliated STA of the AP MLD for that link. A value of 1 up to n in the Address subfield 1406 also indicates that the retransmission is on a link that is different from the initial transmission. On the other hand, if the Retry subfield has a value of 0 (i.e. indicating that the received MPDU is an initial transmission), the A1, A2, A3 fields of MAC Header 1406 are used to generate the AAD and Nonce (conventional behavior).

Assumptions for this embodiment are that the same PTK is used for all the links, and that the CCMP Header of the MPDU is transmitted in the clear (i.e. unencrypted), so changing its value during retransmissions advantageously does not require re-encapsulation. However, if different links use different PTKs, during retransmissions in a different link, the MPDU will need to be encapsulated again using the PTK for that link. In this case, the CCMP encapsulation may follow the conventional method of using the Address fields of the MAC Header of the (re-transmitted) MPDU to generate the AAD and the Nonce fields. However, even in this case the transmitting MLD can still signal in the CCMP Header that the Address fields of the MAC Header of the (re-transmitted) MPDU are to be used to generate the AAD and the Nonce fields, enabling the receiving MLD to correctly decapsulate a received Protected MPDU.

Figure 15:
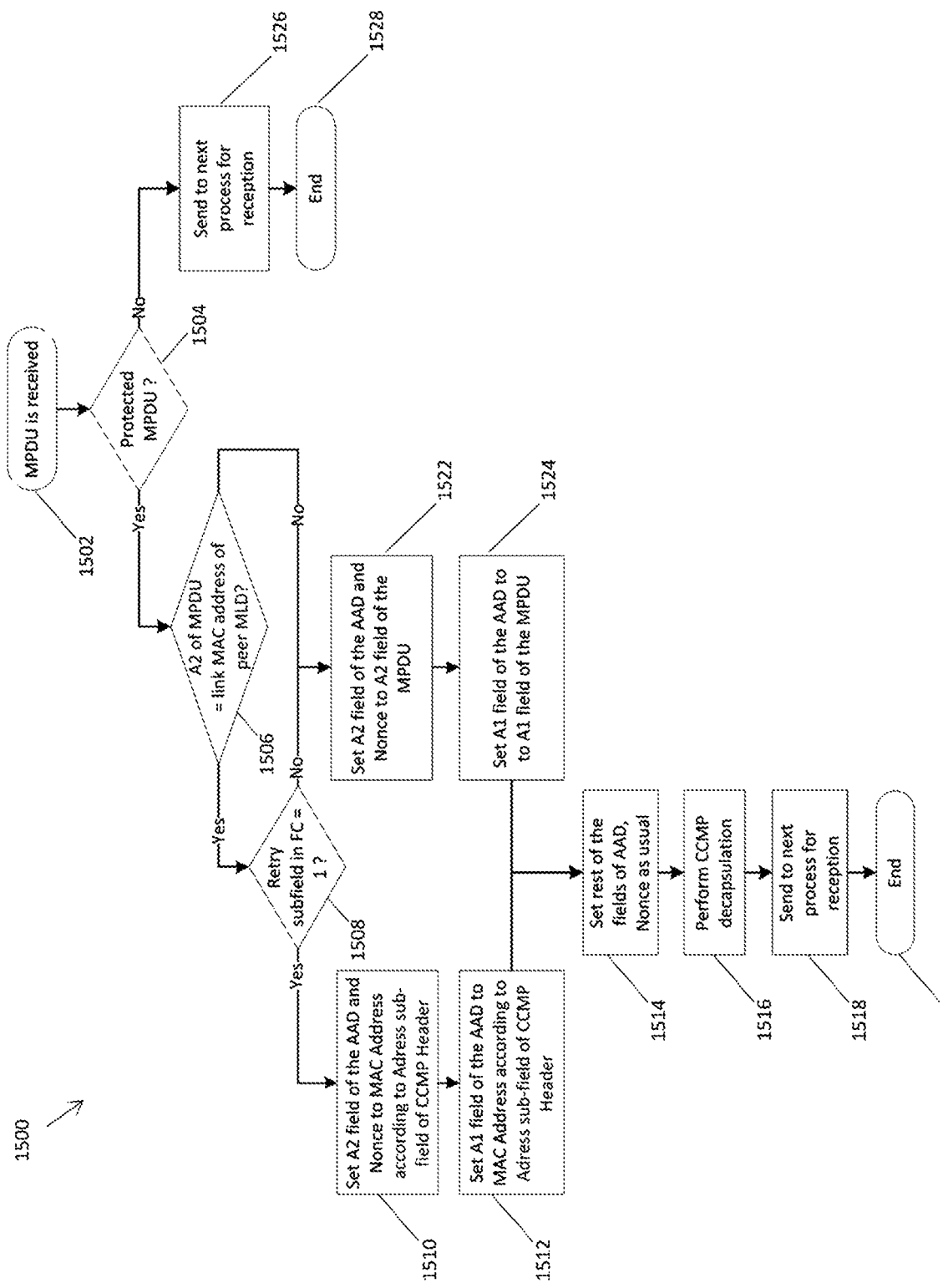
FIG. 15 depicts a flowchart for reception of a MPDU in accordance with a third embodiment.

FIG. 15 depicts a flowchart 1500 for reception of a MPDU in accordance with the third embodiment. At step 1502, a MPDU is received. At step 1504, it is determined whether the MPDU is protected. If the MPDU is not protected, the process goes to step 1526 where the MPDU is sent to a next process for reception and the process then ends at step 1528. If it is determined at step 1504 that the MPDU is protected, the process goes to step 1506 where it is determined if the A2 field of the received MPDU indicates the MAC address that identifies a peer MLD. For a non-AP MLD, peer MLD refers to an AP MLD with which it is associated. For an AP MLD, peer MLD refers to a non-AP MLD that is associated with it. If it is determined at step 1506 that the A2 field is set to the MAC address that identifies a peer MLD, the process goes to step 1508 where it is determined if the Retry subfield in the FC field of the MPDU is set to 1. If it is determined that the Retry subfield is set to 1, the process goes to step 1510 where the A2 fields of the constructed AAD and Nonce are set to a MAC address according to the Address subfield of the CCMP Header of the MPDU (i.e. in accordance with the table 1408 of FIG. 14), proceeds to step 1512 where the A1 field of the constructed AAD is set to a MAC address according to the Address subfield of the CCMP Header of the MPDU (i.e. in accordance with the table 1408 of FIG. 14), and then continues from step 1514. If it is determined at step 1506 that the A2 field of the received MPDU does not indicate the MAC address of the peer MLD, or if it is determined at step 1508 that the Retry subfield in the FC field of the MPDU is not 1, the process goes to step 1522 where the A2 field of the constructed AAD and Nonce are set to the A2 field of the MPDU, proceeds to step 1524 where the A1 field of the constructed AAD is set to the A1 field of the MPDU, and then continues from step 1514. At step 1514, the rest of the fields in the AAD and Nonce are set as usual. Although, not shown in the figure, in MPDUs in which A3 is set to BSSID (e.g. Data frames with To/From DS=0; or management frames), if the BSSID of Link 2 is different, A3 (which is set to the BSSID in such frames; the BSSID typically being the same as the AP MLD's MAC address on that link) is also changed to MLD-TA (or the BSSID for that link if it is different from MLD-TA) if the transmitter is AP MLD and MLD-RA (or the BSSID for that link if it is different from MLD-RA) if the transmitter is non-AP MLD. At step 1516, CCMP decapsulation is performed on the MPDU with the constructed AAD and Nonce. At step 1518, the decrypted MPDU is sent to a next process for reception and the process ends at step 1520. An advantageous effect of the above process is that CCMP encapsulation and decapsulation differs from legacy only for retransmissions, thus minimizing the modifications required for implementing the present embodiment. Further, the receiving MLD can also check the CCMP Header of the received MPDU to determine if it is a retransmitted MPDU i.e. based on the value of the Address subfield in the CCMP Header (in addition to the Retry subfield in the FC).

Figure 16:
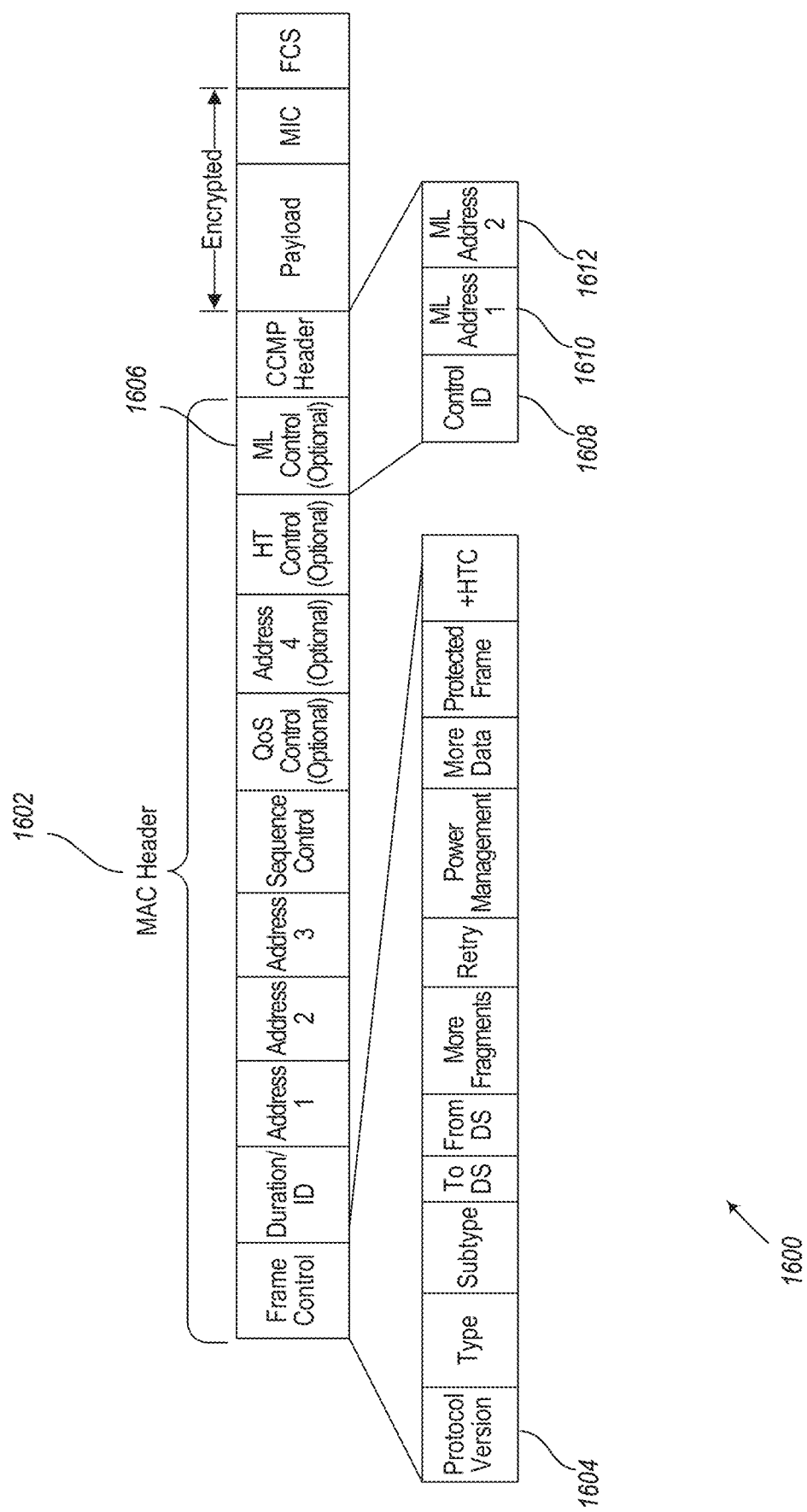
FIG. 16 depicts an illustration of a protected MPDU in accordance with a fourth embodiment.

According to a fourth embodiment, it is also possible that data and management frames transmitted by or transmitted to MLDs may have a different MAC header format that carry information specific to Multi-link transmissions i.e. information such as MAC addresses of transmitting and receiving MLDs. FIG. 16A depicts an illustration of a protected MPDU 1600 having a modified MAC Header 1602 in accordance with a fourth embodiment. In the fourth embodiment, the Protocol Version (PV) field 1604 may be used to differentiate multi-link frames from legacy and PV1 (802.11ah) frames. For example, if the PV field 1604 is set to value of 2, it indicates that the MPDU 1600 is a multi-link frame. Alternatively, one or more new frame types may be defined in 802.11be to indicate the new MAC Header format. Further, the MAC Header 1602 includes a ML Control field 1606 that may be used to carry control information related to Multi-link transmissions. The ML Control field 1606 comprises a Control ID subfield 1608 which, when set to a certain value, the rest of the ML Control field carries a ML Address 1 subfield 1610 and a ML Address 2 subfield 1612.

The Control ID subfield 1608 indicates options for ML Control field 1606. For example, when the Control ID subfield 1608 has a value of 1, the ML Control field 1606 carries the MAC Addresses of receiving/transmitting MLDs. These MAC addresses are indicated in the ML Address 1 subfield 1610 and ML Address 2 subfield 1612. For example, the ML Address 1 subfield 1610 is set to the MAC Address of the transmitter MLD and the ML Address 2 subfield 1612 is set to the MAC Address of the receiving MLD. AAD and Nonce construction during CCMP encapsulation/decapsulation will then use the MLD addresses carried in the Multi-link frames. For example, the A1 field of the constructed AAD will be set to the MLD Address of the receiving MLD as indicated in the ML Address 1 subfield 1610, while the A2 fields of the constructed AAD and Nonce are set to the MLD Address of the transmitting MLD as indicated in the ML Address 2 subfield 1612. If applicable, the A3 field may also be set to the MLD Address of the AP MLD as explained earlier. Even if either or both ML Addresses in the ML Control field 1606 use a short ID format (i.e. 12-bits MLD ID) instead of full MAC address (48-bits), AAD and Nonce can still use the full MAC addresses corresponding to the MLD IDs (i.e. retrieved from Association record (for AP MLD) or from a record of the MLD MAC Address to MLD ID mapping, for example saved during the multi-link association procedure).

Figure 17:
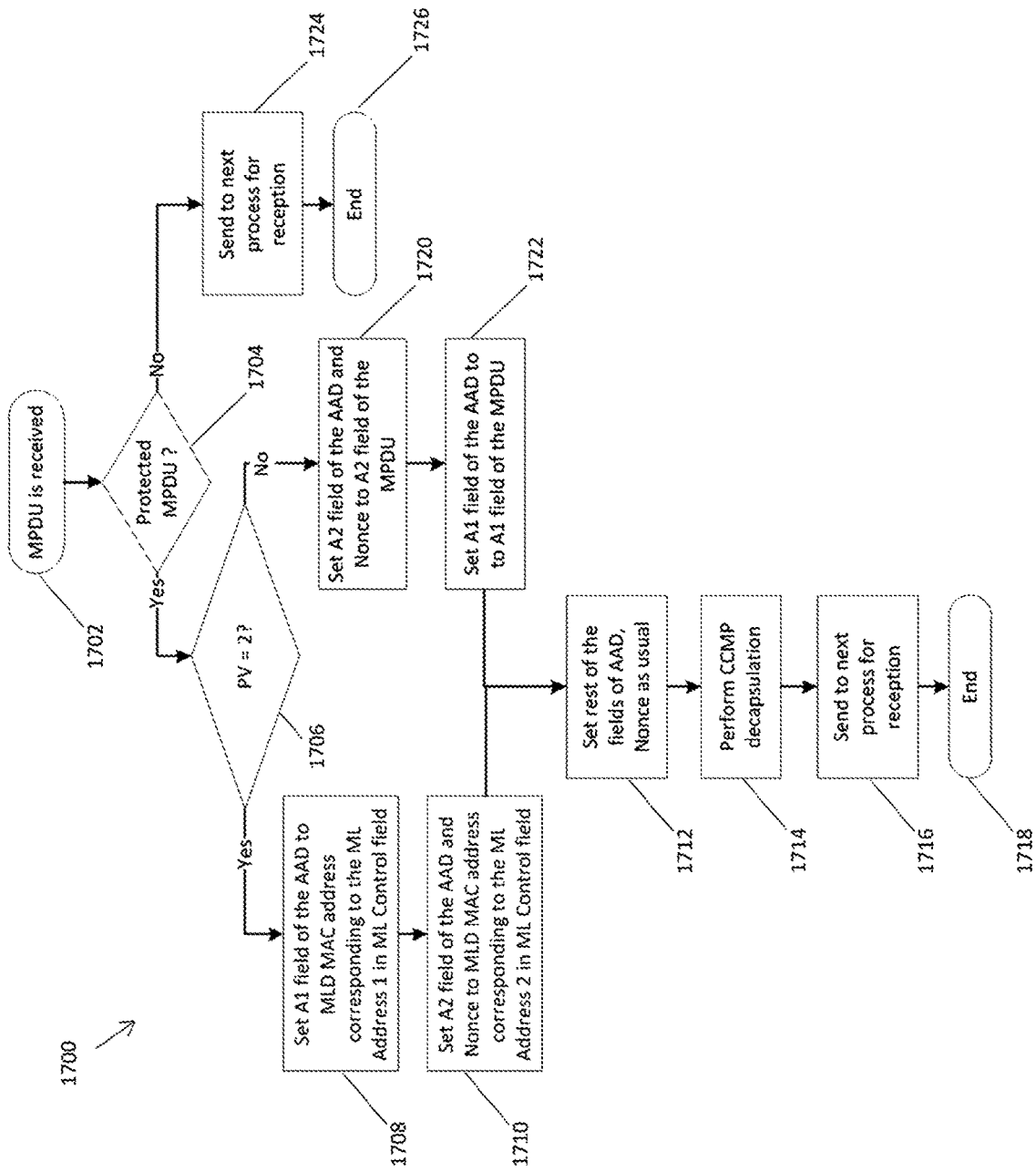
FIG. 17 depicts a flowchart for reception of a MPDU in accordance with a fourth embodiment.

FIG. 17 depicts a flowchart 1700 for reception of a MPDU in accordance with the first embodiment. At step 1702, a MPDU is received. At step 1704, it is determined whether the MPDU is protected. If the MPDU is not protected, the process goes to step 1724 where the MPDU is sent to a next process for reception and the process then ends at step 1726. If it is determined at step 1704 that the MPDU is protected, the process goes to step 1706 where it is determined if the MPDU uses a new frame format, for example by checking if the PV field in the MAC Header of the received MPDU has a value of 2. If it is determined that the PV field does not have a value of 2, the process goes to step 1720 where the A2 field of the constructed AAD and Nonce are set to the A2 field of the MPDU, proceeds to step 1722 where the A1 field of the constructed AAD is set to the A1 field of the MPDU, and then continues from step 1712. If it is determined at step 1706 that the PV field has a value of 2, the process goes to step 1708 where the A1 field of the constructed AAD is set to the MLD MAC address corresponding to the ML Address 1 subfield in the ML Control field of the received MPDU, proceeds to step 1710 where the A2 field of the constructed AAD and Nonce are set to the MLD MAC address corresponding to the ML Address 2 subfield in the ML Control field of the received MPDU, and then continues from step 1712. At step 1712, the rest of the fields in the AAD and Nonce are set as usual. Although, not shown in the figure, in MPDUs in which A3 is set to BSSID (e.g. Data frames with To/From DS=0; or management frames), if the BSSID of Link 2 is different, A3 (which is set to the BSSID in such frames; the BSSID typically being the same as the AP MLD's MAC address on that link) is also changed to MLD-TA (or the BSSID for that link if it is different from MLD-TA) if the transmitter is AP MLD and MLD-RA (or the BSSID for that link if it is different from MLD-RA) if the transmitter is non-AP MLD. At step 1714, CCMP decapsulation is performed on the MPDU with the constructed AAD and Nonce. At step 1716, the decrypted MPDU is sent to a next process for reception and the process ends at step 1718. An advantageous effect of the above process is that CCMP encapsulation/decapsulation is still based on the MPDU fields, thus minimizing the modifications required for implementing the present embodiment.

Figure 18A:
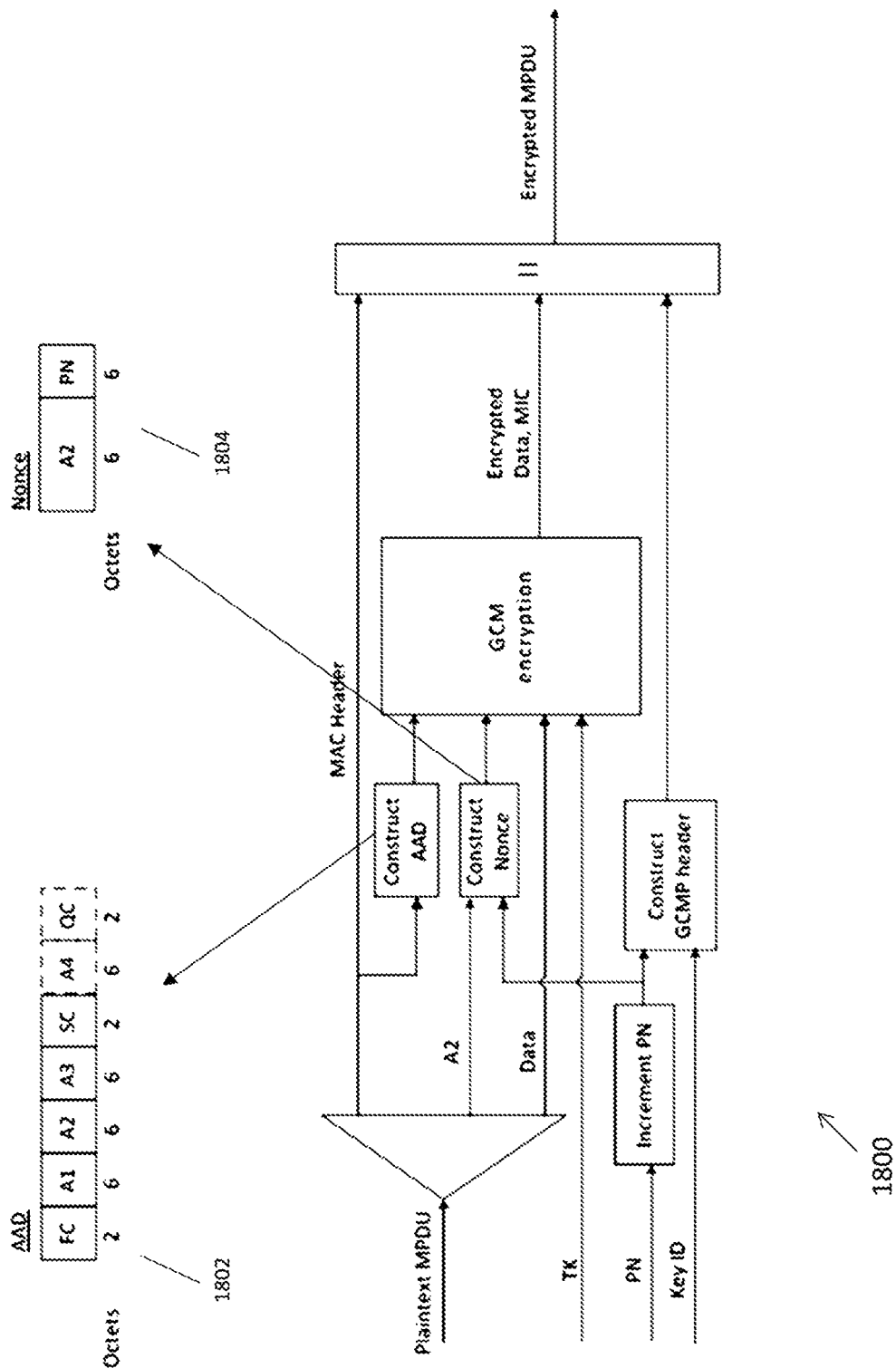
FIG. 18A depicts an illustration of a Galois/counter mode protocol (GCMP) encapsulation process to form an encrypted MPDU in accordance with a fifth embodiment.

The techniques that are described in the first to third embodiments can also work for Galois/counter mode protocol (GCMP), which is currently used by Directional multi-gigabit (DMG) and Enhanced DMG (EDMG) 802.11 STAs but may also be used by sub 7 GHz 802.11 STAs in the future. FIG. 18A depicts an illustration 1800 of a GCMP encapsulation process to form an encrypted MPDU in accordance with a fifth embodiment. CCMP is based on a "chained" mode of operation that requires in-order processing of the 16-byte chunks because chained cryptographic modes require the output of one stage to be used as the input to the next. GCMP, on the other hand, uses the same AES cryptographic engine, but embeds it into a more efficient framework. Compared with CCMP, GCMP requires only half the number of encryption operations, and, more importantly, is not chained so that GCMP cryptographic acceleration can be applied to an entire transmitted frame in parallel. As can be seen in illustration 1800, GCMP encapsulation process is almost the same as CCMP encapsulation. However, while constructed AAD 1802 for use in GCMP encapsulation is the same as a constructed AAD for CCMP encapsulation, constructed Nonce 1804 for use in GCMP encapsulation differs from a Nonce used in CCMP encapsulation in that Nonce 1804 does not include a Priority field.

Figure 18B:
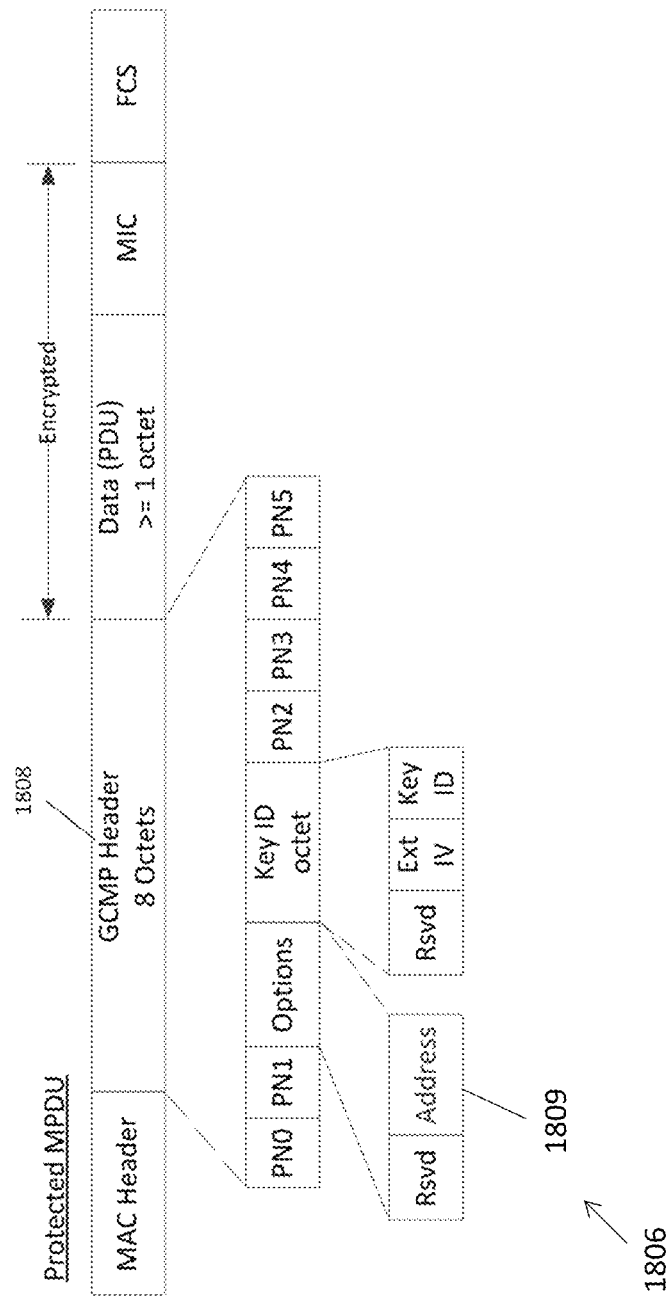
FIG. 18B depicts an illustration of a GCMP protected MPDU in accordance with a fifth embodiment.
Figure 18C:
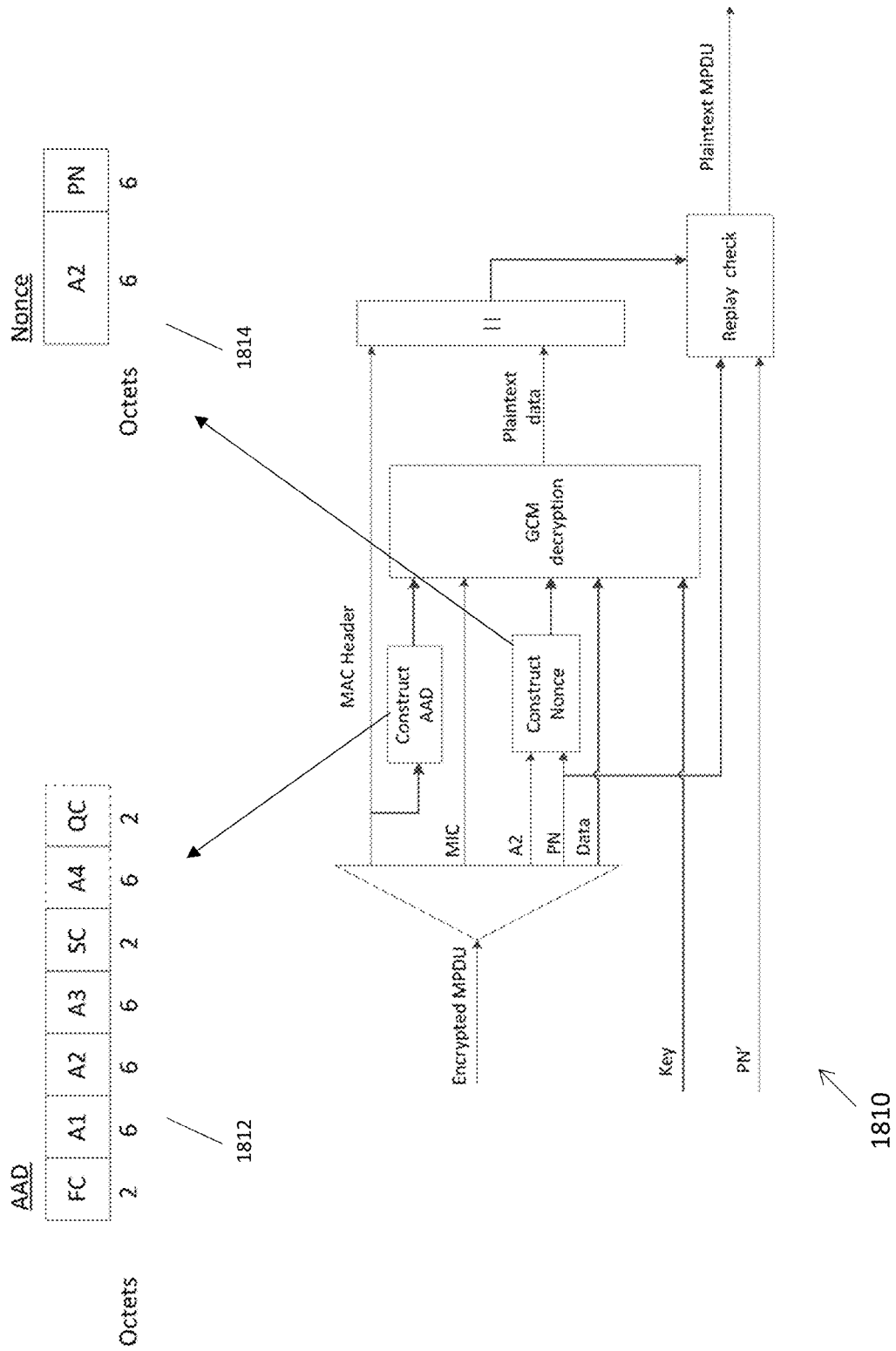
FIG. 18C depicts an illustration of a GCMP decapsulation process to form a plaintext MPDU in accordance with a fifth embodiment.

FIG. 18B depicts an illustration of a GCMP protected MPDU 1806 in accordance with the fifth embodiment. Having been encrypted by GCMP, the MPDU 1806 includes a GCMP Header 1808 instead of a CCMP Header. The GCMP Header 1808 includes an Options field, which in turn carries an Address field 1809 that is used to signal the Address fields to be used for the construction of the AAD and the Nonce fields during the GCMP decapsulation. FIG. 18C depicts an illustration of a GCMP decapsulation process to form a plaintext MPDU in accordance with the fifth embodiment. Similar to GCMP encapsulation, GCMP decapsulation process is almost the same as CCMP decapsulation. However, while constructed AAD 1812 for use in GCMP decapsulation is the same as a constructed AAD for CCMP decapsulation, constructed Nonce 1814 for use in GCMP decapsulation differs from a Nonce used in CCMP decapsulation in that Nonce 1814 does not include a Priority field. The receiving MLD can refer to the Address field 1809 to determine the Address fields to be used for the construction of the AAD and the Nonce fields during the GCMP decapsulation.

Figure 19:
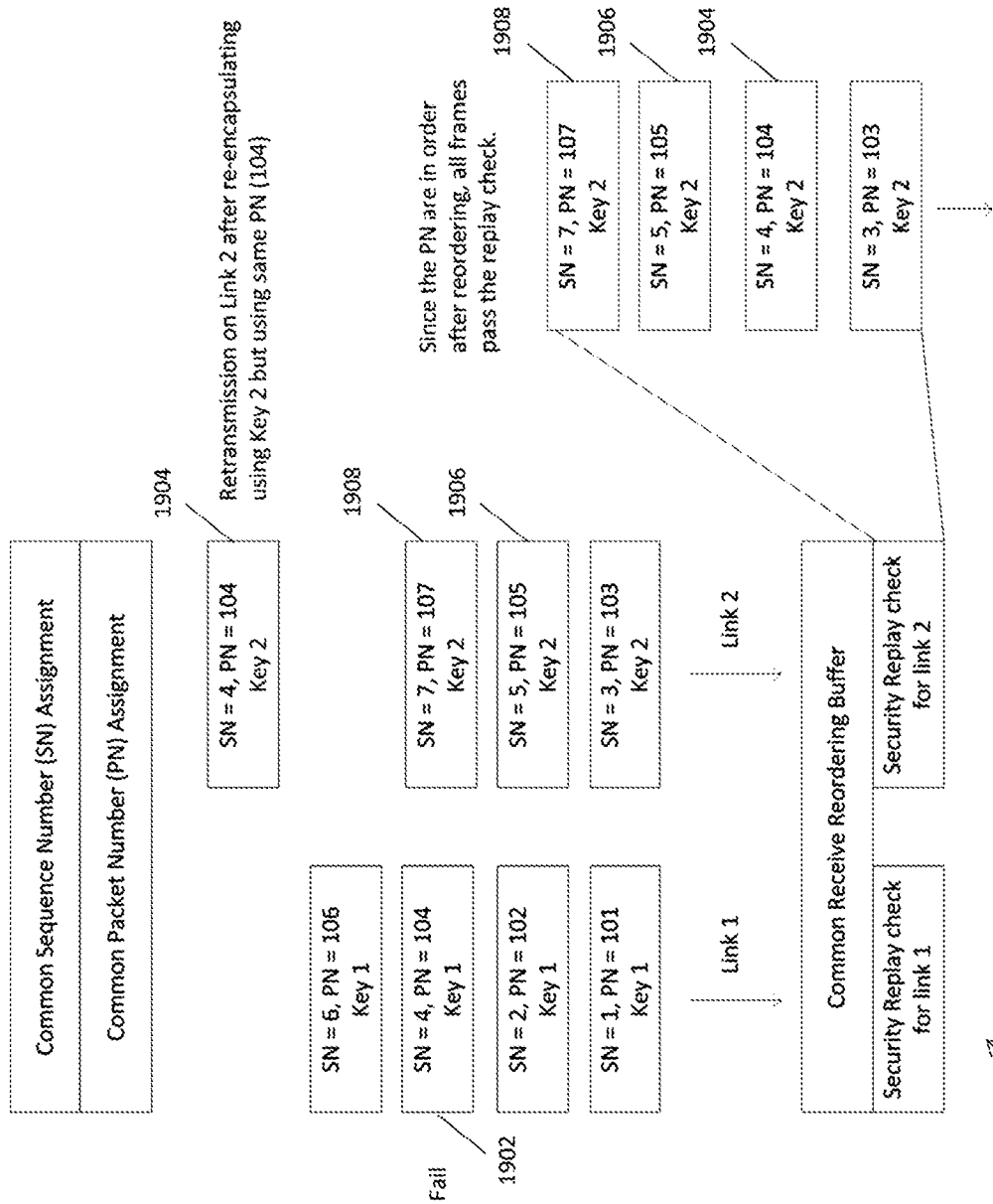
FIG. 19 depicts an illustration of a multi-link MPDU transmission using a common Packet Number (PN) assignment for all links in accordance with various embodiments.

FIG. 19 depicts an illustration 1900 of a multi-link MPDU transmission using a common Packet Number (PN) assignment for all links in accordance with various embodiments. While similar to the multi-link MPDU transmission using separate PTKs as shown in illustration 300 in FIG. 3, a common PN assignment is used in both Link 1 and Link 2 for transmitting MPDUs. In the present example, MPDU 1902 on Link 1 fails to be transmitted, so it is scheduled to be retransmitted on a different link such as Link 2 instead of Link 1. Since Link 2 uses a different PTK (i.e. Key 2), the MPDU needs to be encapsulated with Key 2 as MPDU 1904 but still using the same SN=4 and the same PN=104 (since a common PN assignment is used for both Link 1 and Link 2) as the MPDU 1902. The receiver MLD then reorders the received MPDUs on Link 2 according to the SN of each received MPDU including MPDU 1904. When reordering up to SN=4 i.e. up to received MPDU 304 with SN=4 and PN=104, the receiver MLD updates a replay counter to PN=104. Unlike illustration 300 of FIG. 3 where the rest of the MPDUs with SN greater than 4 (i.e. received MPDU 306 with SN=6, PN=52 and received MPDU 308 with SN=7, PN=53) are dropped causing a replay rejection issue, MPDUs 1906 and 1908 pass the replay check since the PN are in order after the reordering process. Thus, regardless of the number of PTKs, if a common PN space is used to assign PN for the keys, and the same PN is used for retransmissions, the replay rejection issue described earlier is resolved.

Figure 20:
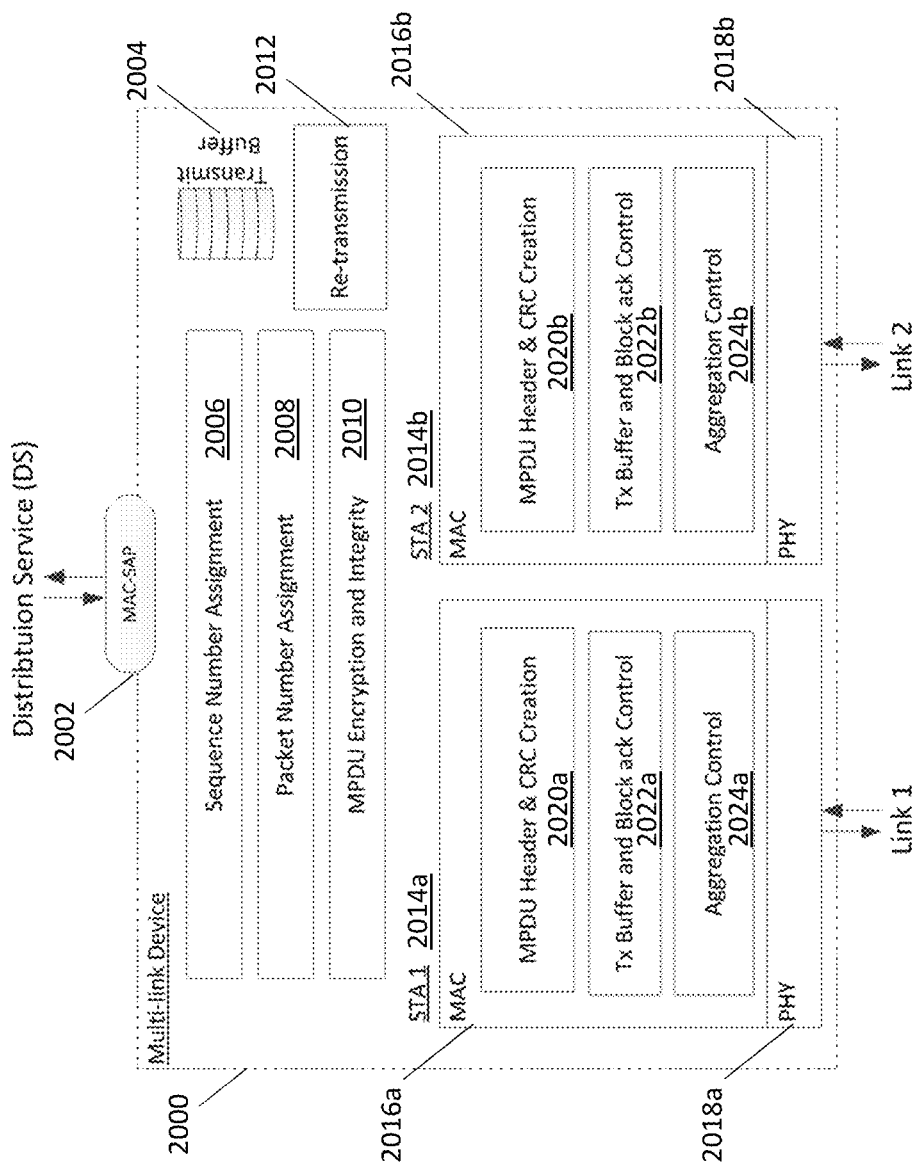
FIG. 20 depicts a schematic of a transmitter MLD 2000 in accordance with various embodiments.

FIG. 20 depicts a schematic of a transmitter MLD 2000 in accordance with various embodiments. The transmitter MLD comprises a MAC-SAP 2002 for performing distribution service (DS), a transmit buffer 2004 (used to store the unprotected MPDUs, and optionally the protected MPDUs), a Sequence Number (SN) Assignment module 2006, a Packet Number (PN) Assignment module 2008, a MPDU Encryption and Integrity module 2010 and a Re-transmission module 2012 (that decides the link to be used for the retransmission, as well the MAC addresses to be used for the AAD and the Nonce construction during the cryptographic encapsulation process). The transmitter MLD 2000 also comprises two affiliated STAs or stations, STA1 2014a and STA2 2014b. STA1 2014a comprises at MAC layer 2016a a MPDU Header & CRC Creation module 2020a, a Transmit (Tx) Buffer and Block acknowledgement (ack) Control module 2022a and an Aggregation Control 2024a. Likewise, STA2 2014b comprises at MAC layer 2016b a MPDU Header & CRC Creation module 2020b, a Tx Buffer and Block ack Control module 2022b and an Aggregation Control 2024b. Both STAs comprise a PHY layer from which transmission via Link 1 (for STA1 2014a) and Link 2 (for STA2 2014b) occurs. It will be appreciated that the number of links and affiliated STAs or stations may be further expanded. The above architecture is appropriate when the same PTK (and or GTK/IGTK) is used for all the links, for even if different PTKs are used for the links, if a same PN space is used for all links, which may help to avoid the replay rejection issue as explained in the context of FIG. 19. However, in deployments that chooses to use different PTKs (and/or GTK/IGTK), the MPDU Encryption and Integrity module 2010 may be moved down to the respective affiliated STAs. If separate PN space are used for the links (PNs are usually tied to their respective secret Keys), the Packet Number (PN) Assignment module 2008 may also be moved down to the respective affiliated STAs.

Figure 21:
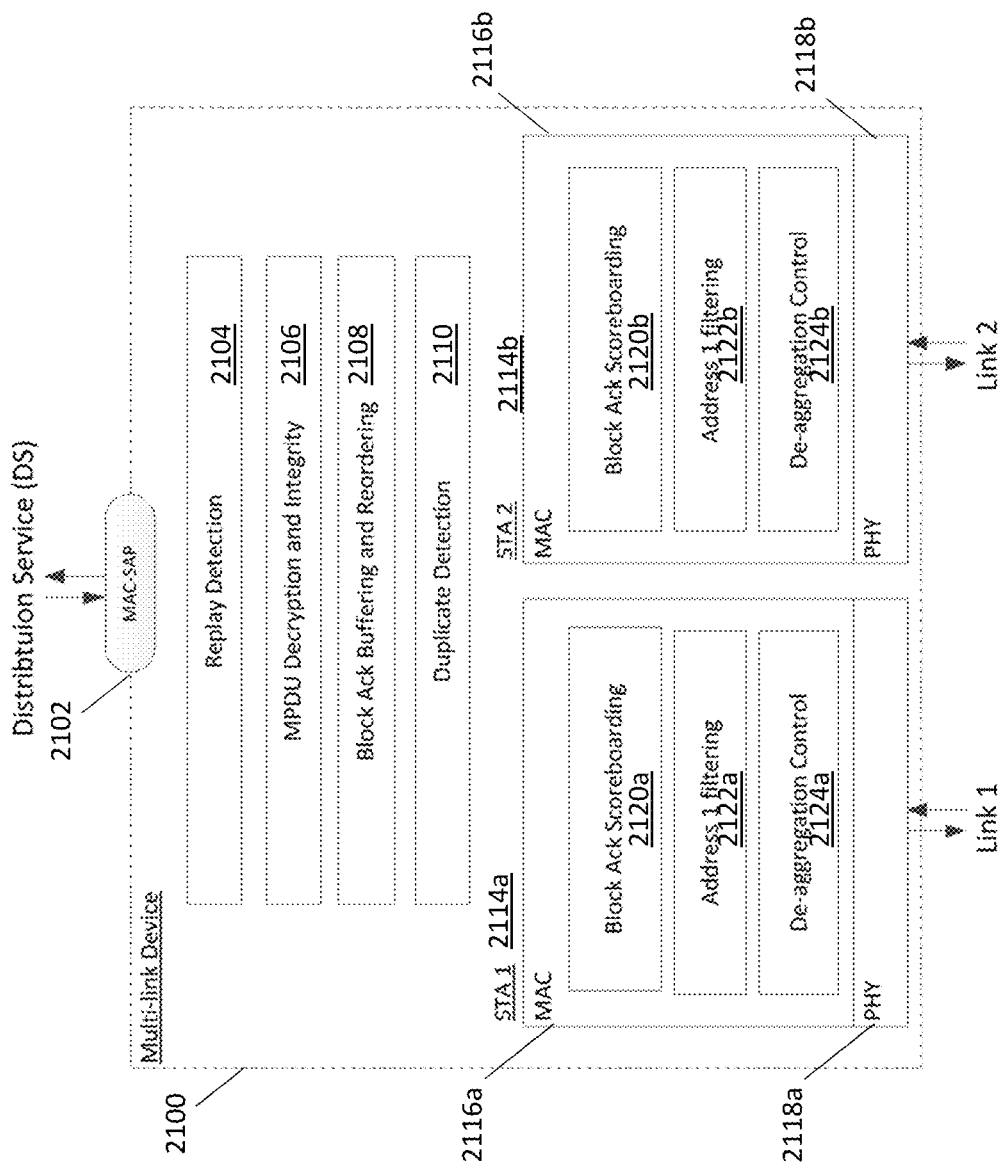
FIG. 21 depicts a schematic of a receiver MLD 2100 in accordance with various embodiments.

FIG. 21 depicts a schematic of a receiver MLD 2100 in accordance with various embodiments. The receiver MLD comprises a MAC-SAP 2102 for performing distribution service (DS), a Replay Detection module 2104, a MPDU Decryption and Integrity module 2106, a Block Ack Buffering and Reordering module 2108 and a Duplicate Detection module 2110. The receiver MLD 2100 also comprises two affiliated STAs or stations, STA1 2114a and STA2 2114b. STA1 2114a comprises at MAC layer 2116a a Block Ack Scoreboarding module 2120a, an Address 1 filtering module 2122a and a De-aggregation Control 2124a. Likewise, STA2 2114b comprises at MAC layer 2116b a Block Ack Scoreboarding module 2120b, an Address 1 filtering module 2122b and a De-aggregation Control 2124b. Both STAs comprise a PHY layer (i.e. 2118a for STA1 2114a and 2118b for STA2 2114b) from which transmission via Link 1 (i.e. between STA1 2114a and STA1 2014a at the transmitter MLD 2000) and Link 2 (i.e. between STA2 2114b and STA2 2014b at the transmitter MLD 2000) occurs. It will be appreciated that the number of links and affiliated STAs or stations may be further expanded. Here, the MPDU Decryption and Integrity module 2106 is responsible for parsing the Address field in the CCMP/GCMP Header to decide the Address fields used to construct the AAD and the Nonce field during the CCMP/GCMP decapsulation.

Figure 22:
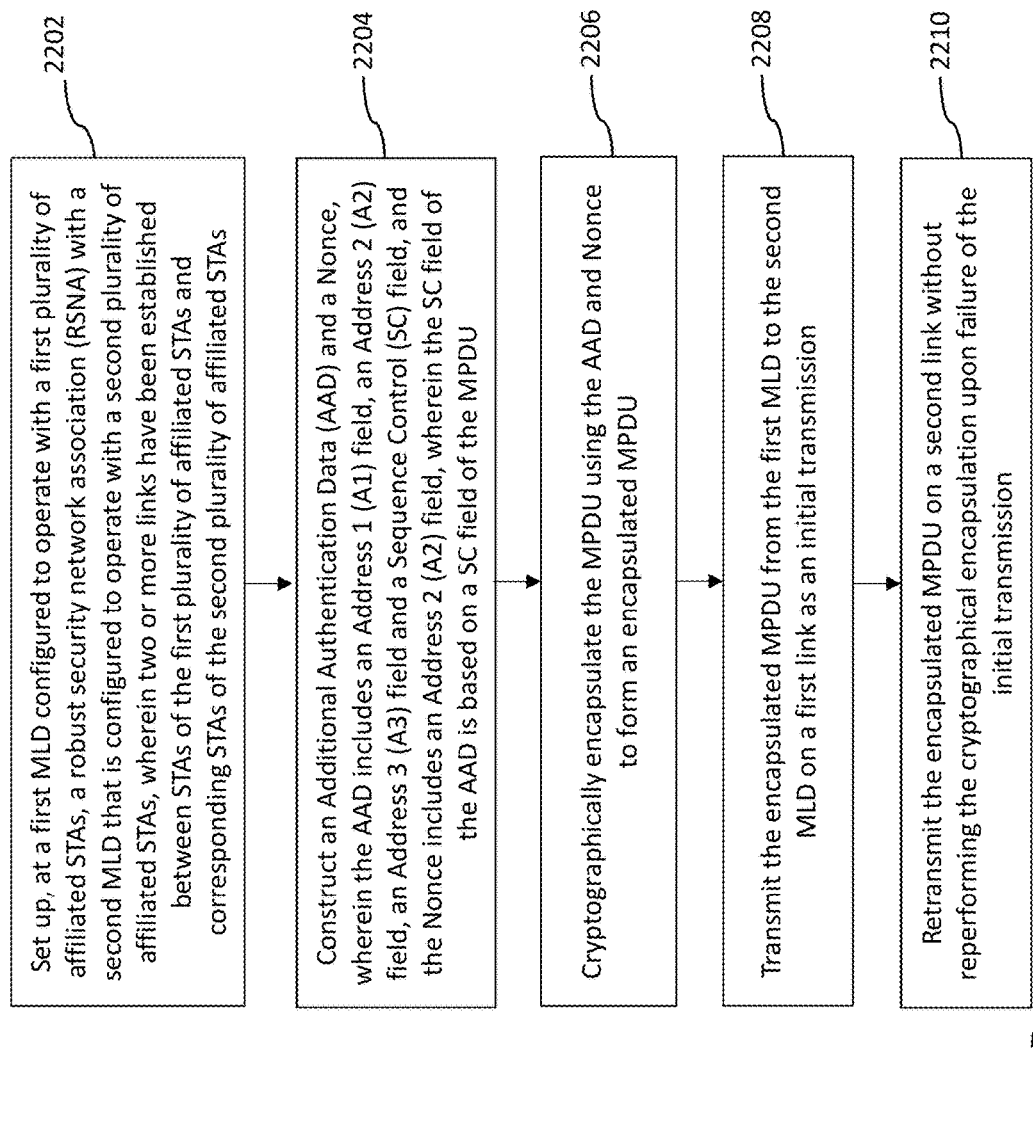
FIG. 22 shows a flow diagram 2200 illustrating a method for multi-link secured retransmission according to various embodiments.

FIG. 22 shows a flow diagram 2200 illustrating a method for multi-link secured retransmission of a MPDU according to various embodiments. At step 2202, a robust security network association (RSNA) is set up, at a first MLD configured to operate with a first plurality of affiliated STAs, with a second MLD that is configured to operate with a second plurality of affiliated STAs, wherein two or more links have been established between STAs of the first plurality of affiliated STAs and corresponding STAs of the second plurality of affiliated STAs. At step 2204, an Additional Authentication Data (AAD) and a Nonce are constructed, wherein the AAD includes an Address 1 (A1) field, an Address 2 (A2) field, an Address 3 (A3) field and a Sequence Control (SC) field, and the Nonce includes an Address 2 (A2) field, wherein the SC field of the AAD is based on a SC field of the MPDU. At step 2206, the MPDU is cryptographically encapsulated using the AAD and Nonce to form an encapsulated MPDU. If applicable, the Address field in the CCMP/GCMP Header is set to signal the Address fields used to generate the AAD and the Nonce field. At step 2208, the encapsulated MPDU is transmitted from the first MLD to the second MLD on a first link as an initial transmission. At step 2210, the encapsulated MPDU is retransmitted on a second link without reperforming the cryptographical encapsulation upon failure of the initial transmission. If applicable, the Address field in the CCMP/GCMP Header in the retransmitted MPDU is set to signal the Address fields used to generate the AAD and the Nonce field during the encapsulation process.

Figure 23:
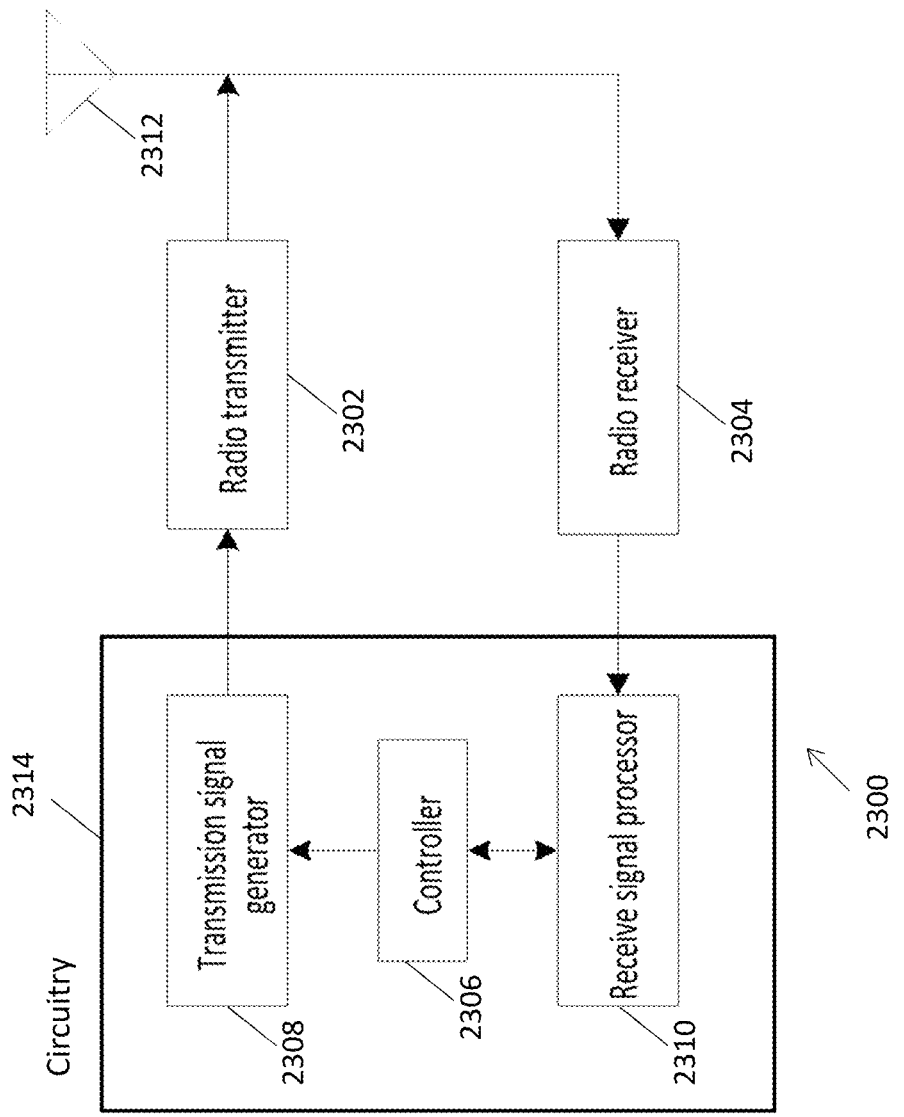
FIG. 23 shows a schematic, partially sectioned view of one of the affiliated STAs of a multi-link device 2300 that can be implemented for multilink secured retransmissions in accordance with the first to fifth embodiments.

FIG. 23 shows a schematic, partially sectioned view of a multi-link device 2300 that can be implemented for multi-link secured retransmissions in accordance with the first to fifth embodiments. The multi-link device 2300 may be implemented as an AP MLD or non-AP MLD, and comprising one or more affiliated stations or STAs according to various embodiments.

Various functions and operations of the multi-link device 2300 are arranged into layers in accordance with a hierarchical model. In the model, lower layers report to higher layers and receive instructions therefrom in accordance with IEEE specifications. For the sake of simplicity, details of the hierarchical model are not discussed in the present disclosure.

As shown in FIG. 23, the multi-link device 2300 may include circuitry 2314, at least one radio transmitter 2302, at least one radio receiver 2304 and multiple antennas 2312 (for the sake of simplicity, only one antenna is depicted in FIG. 23 for illustration purposes). The circuitry may include at least one controller 2306 for use in software and hardware aided execution of tasks it is designed to perform, including control of communications with one or more other multi-link devices in a MIMO wireless network. The at least one controller 2306 may control at least one transmission signal generator 2308 for generating MPDU to be sent through the at least one radio transmitter 2302 to one or more other multi-link devices and at least one receive signal processor 2310 for processing MPDU received through the at least one radio receiver 2304 from the one or more other multi-link devices. The at least one controller 2306 may also control the at least one transmission signal generator 2308 and/or the least one receive signal processor 2310 for constructing AAD and Nonce frames, as well as performing CCMP or GCMP encapsulation or decapsulation on MPDUs using the constructed AAD and Nonce frames. The at least one transmission signal generator 2308 and the at least one receive signal processor 2310 may be stand-alone modules of the multi-link device 2300 that communicate with the at least one controller 2306 for the above-mentioned functions. Alternatively, the at least one transmission signal generator 2308 and the at least one receive signal processor 2310 may be included in the at least one controller 2306. It is appreciable to those skilled in the art that the arrangement of these functional modules is flexible and may vary depending on the practical needs and/or requirements. The data processing, storage and other relevant control apparatus can be provided on an appropriate circuit board and/or in chipsets.

In various embodiments, when in operation, the at least one radio transmitter 2302, at least one radio receiver 2304, and at least one antenna 2312 may be controlled by the at least one controller 2306. Furthermore, while only one radio transmitter 2302 is shown, it will be appreciated that there can be more than one of such transmitters i.e. one transmitter for each affiliated station or STA of the multi-link device 2300.

In various embodiments, when in operation, the at least one radio receiver 2304, together with the at least one receive signal processor 2310, forms a receiver of the multi-link device 2300. The receiver of the multi-link device 2300, when in operation, provides functions required for multi-link communication. While only one radio receiver 2304 is shown, it will be appreciated that there can be more than one of such receivers i.e. one receiver for each affiliated station or STA of the multi-link device 2300.

The multi-link device 2300, when in operation, provides functions required for multi-link secured retransmissions. For example, the multi-link device 2300 may be a first multi-link device configured to operate with a first plurality of affiliated STAs. The circuitry 2314 may, in operation, set up a robust security network association (RSNA) with a second MLD that is configured to operate with a second plurality of affiliated STAs, wherein two or more links have been established between STAs of the first plurality of affiliated STAs and corresponding STAs of the second plurality of affiliated STAs, wherein the circuitry constructs an Additional Authentication Data (AAD) and a Nonce that are used for cryptographical encapsulation of a MAC protocol data unit (MPDU) to form an encapsulated MPDU, wherein the AAD includes an Address 1 (A1) field, an Address 2 (A2) field, an Address 3 (A3) field, and a Sequence Control (SC) field, and the Nonce includes an Address 2 (A2) field, and wherein the SC field of the AAD is based on a SC field of the MPDU. The transmitter 2302 may, in operation, transmit the encapsulated MPDU to the second MLD on a first link as an initial transmission, and upon failure of the initial transmission, retransmit the encapsulated MPDU on a second link without reperforming the cryptographical encapsulation.

The A2 field of the AAD and the Nonce may be set to a medium access control (MAC) address that identifies the first MLD, and the A1 field of the AAD may be set to a MAC address that identifies the second MLD. One of a CCMP or a GCMP may be used to cryptographically protect the MPDU. The MPDU may comprise identification information of the first and second MLDs, wherein the A2 field of the AAD and the Nonce may be set to a MAC address that identifies the first MLD indicated in the identification information, and the A1 field of the AAD may be set to a MAC address that identifies the second MLD indicated in the identification information.

The circuitry 2314 may specify in the MPDU settings of the A1, A2, A3 fields, the settings indicating whether, during cryptographical decapsulation of the MPDU, the A1, A2, A3 fields are to be set to a MAC address that identifies the second MLD, a MAC address that identifies the first MLD and a MAC address that identifies an AP MLD respectively, or the A1, A2, A3 fields are to be set to a MAC address of an affiliated STA of the second MLD, a MAC address of an affiliated STA of the first MLD and the MAC address that identifies the AP MLD respectively, or the A1, A2, A3 fields are to be set to A1, A2, A3 fields of the MPDU respectively, wherein the AP MLD is the first or second MLD. The settings of the A1, A2, A3 fields may be indicated in one of a Counter Mode Cipher Block Chaining Message Authentication Code Protocol (CCMP) Header field or a Galois/Counter Mode Protocol (GCMP) Header field of the encapsulated MPDU.

The A2 field of the AAD and the Nonce may be set to an A2 field of the MPDU, and the A1 field of the AAD may be set to an A1 field of the MPDU, wherein upon failure of the initial transmission, the circuitry 2314 further may specify in the retransmitted MPDU settings of the A1, A2, A3 fields, the settings indicating whether, during cryptographical decapsulation of the retransmitted MPDU, the A1, A2, A3 fields are to be set to a MAC address of an affiliated STA of the second MLD, a MAC address of an affiliated STA of the first MLD and the MAC address that identifies the AP MLD respectively, or the A1, A2, A3 fields are to be set to the A1, A2, A3 fields of the retransmitted MPDU respectively.

For example, the multi-link device 2300 may be a first multi-link device configured to operate with a first plurality of affiliated STAs. The circuitry 2314 may, in operation, set up a robust security network association (RSNA) with a second MLD that is configured to operate with a second plurality of affiliated STAs, wherein two or more links have been established between STAs of the first plurality of affiliated STAs and corresponding STAs of the second plurality of affiliated STAs. The receiver 2304 may, in operation, receive a cryptographically encapsulated MAC protocol data unit (MPDU) from the second MLD, wherein the circuitry 2314 constructs an Additional Authentication Data (AAD) and a Nonce that are used for cryptographical decapsulation of the received MPDU, wherein the AAD includes an Address 1 (A1) field, an Address 2 (A2) field, an Address 3 (A3) field, and a Sequence Control (SC) field, and the Nonce includes an Address 2 (A2) field, wherein the A2 field of the AAD and the Nonce may be set to either an A2 field of the MPDU or a medium access control (MAC) address that identifies the second MLD or a MAC address of one of the second plurality of affiliated STAs, the A1 field of the AAD may be set to either an A1 field of the MPDU or a MAC address that identifies the first MLD or a MAC address of one of the first plurality of affiliated STAs, the Address 3 (A3) field of the AAD may be set to the BSSID field of a link, or the A3 field of the MPDU, or the MAC Address of the AP MLD and the SC field of the AAD is based on a SC field of the MPDU.

The circuitry 2314 may cryptographically decapsulate the MPDU received from the second MLD, wherein the A2 field of the AAD and the Nonce may be set to the MAC address that identifies the second MLD, and the A1 field of the AAD may be set to the MAC address that identifies the first MLD. One of a CCMP or a GCMP may be used to cryptographically decapsulate the MPDU. The MPDU may carry identification information of the first and second MLDs, wherein the circuitry may cryptographically decapsulate the MPDU by setting the A2 field of the AAD and the Nonce to the MAC address that identifies the second MLD indicated in the MPDU, and the A1 field of the AAD to the MAC address that identifies the first MLD indicated in the MPDU.

The circuitry 2314 may cryptographically decapsulate the received MPDU based on settings of the A1, A2, A3 fields indicated in the MPDU, the settings indicating whether, during the cryptographical decapsulation, the A1, A2, A3 fields are to be set to the MAC address that identifies the first MLD, the MAC address that identifies the second MLD and the MAC address that identifies an AP MLD respectively, or the A1, A2, A3 fields are to be set to the MAC address of an affiliated STA of the first MLD, the MAC address of an affiliated STA of the second MLD and the MAC address that identifies the AP MLD respectively, or the A1, A2, A3 fields are to be set to the A1, A2, A3 fields of the MPDU respectively, wherein the AP MLD is the first or second MLD. The settings of the Address fields may be indicated in one of a CCMP Header or a GCMP Header of the MPDU received from the second MLD.

The circuitry 2314 may cryptographically decapsulate a first MPDU received from the second MLD by setting the A2 field of the AAD and the Nonce to the A2 field of the first MPDU, and the A1 field of the AAD to the A1 field of the first MPDU, wherein the first MPDU includes a Retry subfield that is set to 0; The circuitry 2314 may cryptographically decapsulate a second MPDU received from the second MLD based on the settings of the A1, A2, A3 fields indicated in the second MPDU, the settings indicating whether, during the cryptographical decapsulation, the A1, A2, A3 fields are to be set to the MAC address of an affiliated STA of the first MLD, the MAC address of an affiliated STA of the second MLD and the MAC address that identifies the AP MLD respectively, or the A1, A2, A3 fields are to be set to A1, A2, A3 fields of the second MPDU respectively, wherein the second MPDU includes a Retry subfield that is set to 1.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication device.

The communication device may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication device include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication device is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication device may comprise an apparatus such as a controller or a sensor which is coupled to a communication apparatus performing a function of communication described in the present disclosure. For example, the communication device may comprise a controller or a sensor that generates control signals or data signals which are used by a communication apparatus performing a communication function of the communication device.

The communication device also may include an infrastructure facility, such as a base station, an access point, and any other apparatus, device or system that communicates with or controls apparatuses such as those in the above non-limiting examples.

As a non-limiting example of an architecture (for example, the architectures as illustrated in FIGS. 20 and 21), the MLD of the present disclosure can be logical and realized by a plurality of separated communication apparatuses sharing a common MAC data service interface to an upper layer.

A non-limiting example of a station may be one included in a first plurality of stations affiliated with a multi-link station logical entity (i.e. such as an MLD), wherein as a part of the first plurality of stations affiliated with the multi-link station logical entity, stations of the first plurality of stations share a common medium access control (MAC) data service interface to an upper layer, wherein the common MAC data service interface is associated with a common MAC address or a Traffic Identifier (TID).

Thus, it can be seen that the present embodiments provide communication devices and methods for operation over multiple links in order to fully realize the throughput gains of multi-link communication, in particular for multi-link secured retransmissions.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims.

The invention claimed is:

1. A recipient multi-link device (MLD) comprising:
a receiver, which in operation, receives an encapsulated medium access control (MAC) protocol data unit (MPDU) transmitted from a transmitting MLD on a first link; and
circuitry, which, in operation, constructs an Additional Authentication Data (AAD) and a Nonce, and decapsulates the received encapsulated MPDU to obtain a plaintext MPDU based on the AAD and the Nonce, wherein the AAD includes an Address 1 (A1) field, to which the recipient MLD's medium access control (MAC) address is set, and an Address 2 (A2) field, to which the transmitting MLD's MAC address is set, and wherein the Nonce includes an Address 2 (A2) field, to which the transmitting MLD's MAC address is set.

2. The recipient MLD according to claim 1, wherein if the reception of the encapsulated MPDU is unsuccessful on the first link, the receiver receives the encapsulated MPDU retransmitted on a second link different from the first link, wherein the retransmitted encapsulated MPDU is not encapsulated with a new packet number (PN).

3. The recipient MLD according to claim 1, wherein a common packet number (PN) is used by the transmitting MLD for initial transmission on the first link and retransmission on another link.

4. The recipient MLD according to claim 1, comprising a second plurality of affiliated STAs that are capable of establishing one or more links with a first plurality of affiliated STAs associated with the transmitting MLD.

5. The recipient MLD according to claim 1, wherein the settings of the A1 and A2 fields are indicated in one of a Counter Mode Cipher Block Chaining Message Authentication Code Protocol (CCMP) Header field or a Galois Counter Mode Protocol (GCMP) Header field of the encapsulated MPDU.

6. The recipient MLD according to claim 1, wherein a single packet number (PN) space is used for reception on a plurality of links.

7. The recipient MLD according to claim 1, wherein one of a Counter Mode Cipher Block Chaining Message Authentication Code Protocol (CCMP) or a Galois Counter Mode Protocol (GCMP) is used to cryptographically protect the MPDU.

8. A communication method for a recipient multi-link device (MLD), the communication method comprising:
receiving an encapsulated medium access control (MAC) protocol data unit (MPDU) transmitted from a transmitting MLD on a first link;
constructing an Additional Authentication Data (AAD) and a Nonce; and
decapsulating the received encapsulated MPDU to obtain a plaintext MPDU based on the AAD and the Nonce, wherein the AAD includes an Address 1 (A1) field, to which the recipient MLD's medium access control (MAC) address is set, and an Address 2 (A2) field, to which the transmitting MLD's MAC address is set, and wherein the Nonce includes an Address 2 (A2) field, to which the transmitting MLD's MAC address is set.

9. The communication method according to claim 8, wherein if the reception of the encapsulated MPDU is unsuccessful on the first link, the receiver receives the encapsulated MPDU retransmitted on a second link different from the first link, wherein the retransmitted encapsulated MPDU is not encapsulated with a new packet number (PN).

10. The communication method according to claim 8, wherein a common packet number (PN) is used by the transmitting MLD for initial transmission on the first link and retransmission on another link.

11. The communication method according to claim 8, wherein the recipient MLD comprises a second plurality of affiliated STAs that are capable of establishing one or more links with a first plurality of affiliated STAs associated with the transmitting MLD.

12. The communication method according to claim 8, wherein the settings of the A1 and A2 fields are indicated in one of a Counter Mode Cipher Block Chaining Message Authentication Code Protocol (CCMP) Header field or a Galois Counter Mode Protocol (GCMP) Header field of the encapsulated MPDU.

13. The communication method according to claim 8, wherein a common packet number (PN) is used for reception on a plurality of links.

14. The communication method according to claim 8, wherein one of a Counter Mode Cipher Block Chaining Message Authentication Code Protocol (CCMP) or a Galois Counter Mode Protocol (GCMP) is used to cryptographically protect the MPDU.

\* \* \* \* \*